United States Patent
Lee

(10) Patent No.: US 12,223,769 B2
(45) Date of Patent: Feb. 11, 2025

(54) ELECTRONIC DEVICE AND OPERATING METHOD OF ELECTRONIC DEVICE FOR CORRECTING ERROR DURING GAZE DIRECTION RECOGNITION

(71) Applicant: SAMSUNG ELECTRONICS CO., LTD., Suwon-si (KR)

(72) Inventor: Cheoljun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 374 days.

(21) Appl. No.: 17/718,905

(22) Filed: Apr. 12, 2022

(65) Prior Publication Data

US 2022/0415083 A1    Dec. 29, 2022

Related U.S. Application Data

(63) Continuation of application No. PCT/KR2022/002425, filed on Feb. 18, 2022.

(30) Foreign Application Priority Data

Jun. 29, 2021 (KR) .................. 10-2021-0084593

(51) Int. Cl.
  *G06V 40/16* (2022.01)
  *G06F 3/01* (2006.01)
(52) U.S. Cl.
  CPC ............ *G06V 40/171* (2022.01); *G06F 3/013* (2013.01); *G06V 40/164* (2022.01)
(58) Field of Classification Search
  None
  See application file for complete search history.

(56) References Cited

U.S. PATENT DOCUMENTS 8,885,882 B1   11/2014   Yin et al.
9,288,388 B2    3/2016   Son et al.
(Continued)

FOREIGN PATENT DOCUMENTS

CN   102625117 B   *   3/2016   .............. G06T 7/11
CN   107193383 B   *   4/2020   ............. G06F 3/013
(Continued)

OTHER PUBLICATIONS

Search Report and Written Opinion dated May 31, 2022 in counterpart International Patent Application No. PCT/KR2022/002425 and English-language translation.
(Continued)

*Primary Examiner* — Jiangeng Sun
(74) *Attorney, Agent, or Firm* — Nixon & Vanderhye, P.C.

(57) ABSTRACT

Disclosed is an electronic device for correcting an error during recognition of a gaze direction. The electronic device includes: a camera module including a camera configured to generate an image frame, a memory, and a processor, and the processor may be configured to: perform face recognition with respect to the image frame, perform extraction of a feature point of the face in response to the face being recognized during the face recognition, recognize a face direction of the face in response to the feature point of the face being extracted, generate gaze direction information by recognizing a gaze direction of the face in response to the recognition of the face direction, generate filtered gaze direction information by performing filtering with respect to the gaze direction information in response to the gaze direction being recognized, and store the filtered gaze direction information in the memory.

14 Claims, 23 Drawing Sheets

(56) References Cited

U.S. PATENT DOCUMENTS

| | | |
|---|---|---|
| 9,489,739 B2 | 11/2016 | Kruglick |
| 9,811,157 B2 | 11/2017 | Rijnders |
| 9,851,788 B2 | 12/2017 | Kim et al. |
| 10,482,333 B1 | 11/2019 | El Kaliouby et al. |
| 10,852,823 B2 | 12/2020 | Ortiz Egea et al. |
| 10,948,981 B2 | 3/2021 | Sinay et al. |
| 11,194,388 B2 | 12/2021 | Kim et al. |
| 11,514,602 B2 | 11/2022 | Guo et al. |
| 2010/0027890 A1 | 2/2010 | Yoshinaga et al. |
| 2013/0222644 A1 | 8/2013 | Son et al. |
| 2014/0300538 A1 | 10/2014 | Rijnders |
| 2014/0361984 A1 | 12/2014 | Kim et al. |
| 2016/0063303 A1 | 3/2016 | Cheung et al. |
| 2017/0237897 A1 | 8/2017 | Sivan |
| 2018/0032135 A1 | 2/2018 | Rijnders |
| 2018/0120935 A1 | 5/2018 | Kim et al. |
| 2020/0202562 A1* | 6/2020 | Guo .................... G06T 7/246 |
| 2020/0309594 A1 | 10/2020 | Wei et al. |
| 2021/0104041 A1 | 4/2021 | Clifton |
| 2022/0004255 A1 | 1/2022 | Kim et al. |

FOREIGN PATENT DOCUMENTS

| | | | | |
|---|---|---|---|---|
| EP | 3789848 | | 3/2021 | |
| JP | 11-073289 | | 3/1999 | |
| JP | 2009206939 A | * | 9/2009 | |
| JP | 4348663 B2 | * | 10/2009 | |
| JP | 4898026 B2 | * | 3/2012 | |
| KR | 1998-017715 | | 6/1998 | |
| KR | 10-2013-0099521 | | 9/2013 | |
| KR | 10-2014-0144510 | | 12/2014 | |
| KR | 10-2015-0143584 | | 12/2015 | |
| KR | 10-1774691 | | 9/2017 | |
| KR | 10-2020-0079411 | | 7/2020 | |
| WO | WO-2010035472 A1 | * | 4/2010 | ............ A61B 3/113 |
| WO | 2020/191643 | | 10/2020 | |
| WO | 2022/149704 | | 7/2022 | |

OTHER PUBLICATIONS

Extended European Search Report dated Mar. 25, 2024 issued in European Patent Application No. 22833353.0.

\* cited by examiner

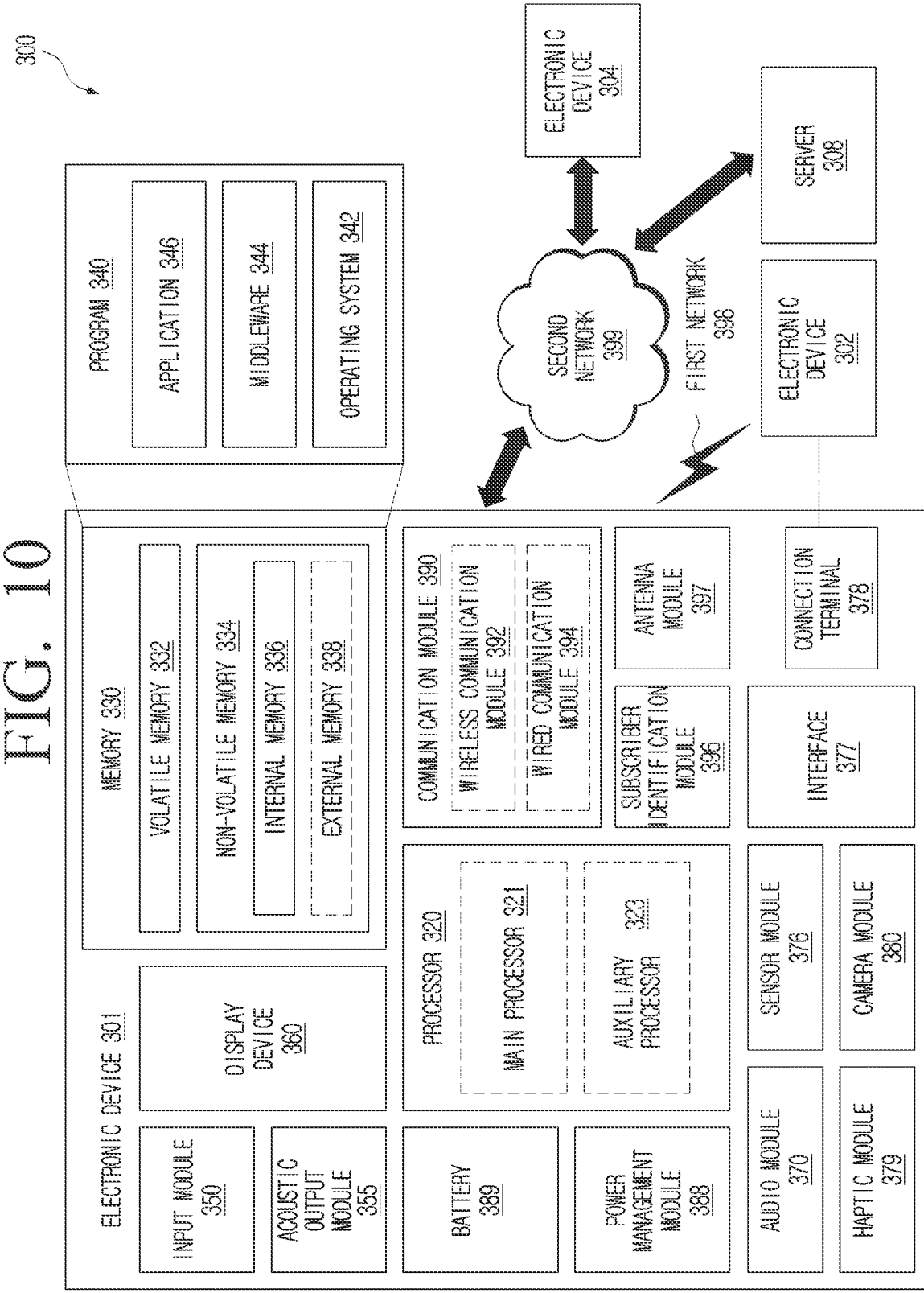

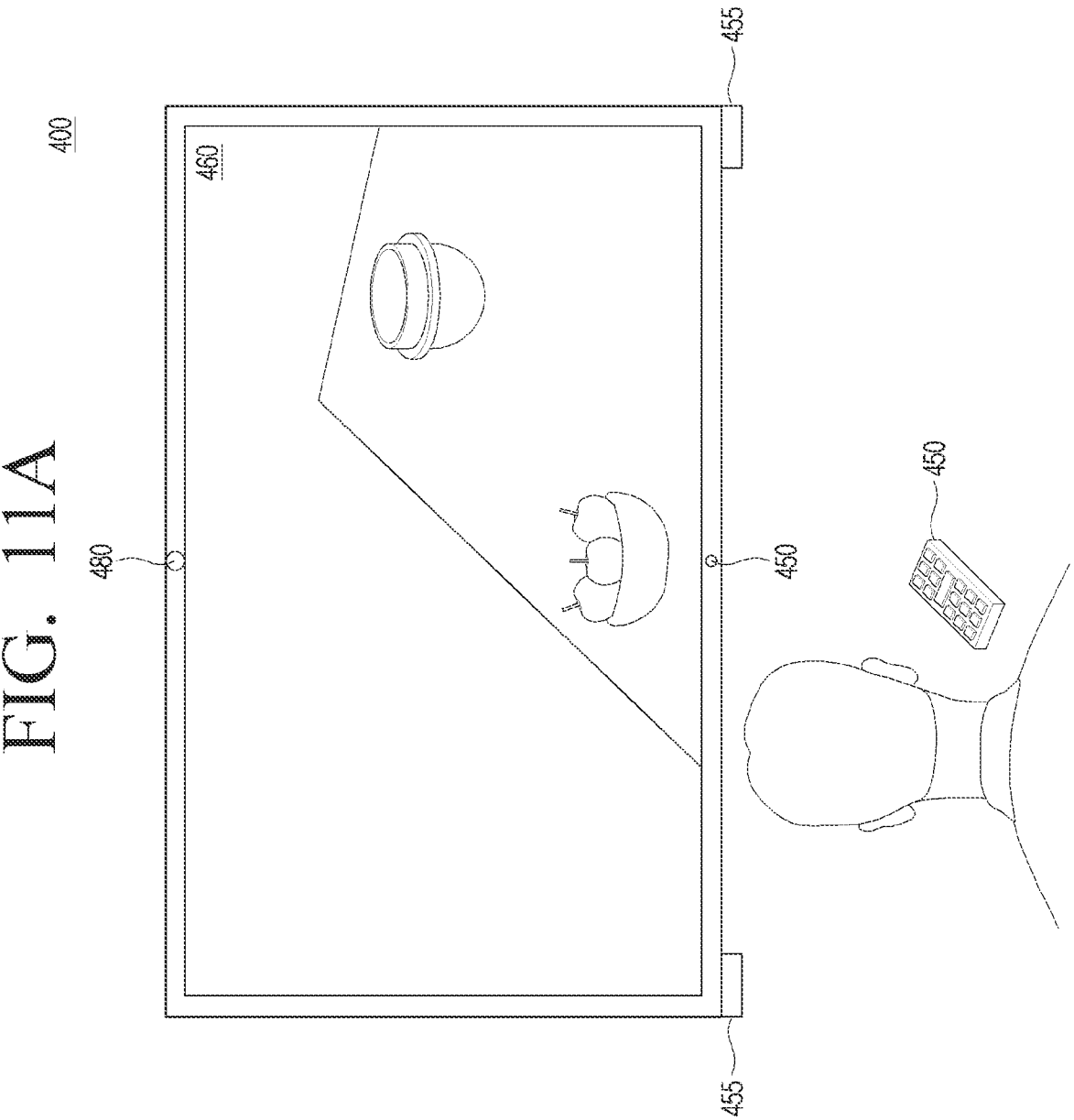

ELECTRONIC DEVICE AND OPERATING METHOD OF ELECTRONIC DEVICE FOR CORRECTING ERROR DURING GAZE DIRECTION RECOGNITION

CROSS-REFERENCE TO RELATED APPLICATIONS

This application is a continuation of International Application No. PCT/KR2022/002425 designating the United States, filed on Feb. 18, 2022, in the Korean Intellectual Property Receiving Office and claiming priority to Korean Patent Application No. 10-2021-0084593, filed on Jun. 29, 2021, in the Korean Intellectual Property Office, the disclosures of which are incorporated by reference herein in their entireties.

BACKGROUND

Field

The disclosure relates to an electronic device and, for example, to an electronic device for correcting an error during gaze direction recognition and an operating method of the electronic device.

Description of Related Art

An image captured by a camera may include two or more colors having a set resolution, for example, red (R), green (G), and blue (B) data. In order to identify whether a human's face is included in an image captured by a camera, technologies for recognizing a face in an image captured by a camera have been studied. The face recognition technology may be used for various purposes, such as identification of a human included in an image, improving quality of service of an image, and the like.

In addition to face recognition, technologies for recognizing a gaze direction from a recognized face in an image captured by a camera have been studied. If a gaze direction is identified from the face of a human included in an image, various services may be provided based on the image.

SUMMARY

Embodiments of the disclosure provide an electronic device for correcting an error generated by a behavior including eye blinking, a cough, a tick disorder, and the like, during gaze direction recognition, and an operating method of the electronic device.

According to an example embodiment, an electronic device includes: a camera module comprising a camera configured to generate an image frame, a memory, and a processor, and the processor may be configured to: perform face recognition with respect to the image frame, perform extraction of a feature point of the face in response to the face being recognized during the face recognition, recognize a face direction of the face in response to the feature point of the face being extracted, generate gaze direction information by recognizing a gaze direction of the face in response to the recognition of the face direction, generate filtered gaze direction information by performing filtering with respect to the gaze direction information in response to the gaze direction being recognized, and store the image frame, the face direction information, and the filtered gaze direction information in the memory.

According to an example embodiment, an operating method of an electronic device comprising a processor, a camera module, and a memory includes: generating an image frame by the camera module; performing face recognition with respect to the image frame by the processor; performing extraction of a feature point of the face by the processor in response to the face being recognized during the face recognition; recognizing a face direction of the face by the processor in response to the feature point of the face being extracted; generating gaze direction information by recognizing a gaze direction of the face by the processor in response to the recognition of the face direction; generating filtered gaze direction information by the processor by performing filtering with respect to the gaze direction information in response to the gaze direction being recognized; and storing by the processor the filtered gaze direction information in the memory.

According to an example embodiment, an operating method of an electronic device comprising a processor and a camera module includes: generating an image frame by the camera module; performing face recognition with respect to the image frame by the processor; performing extraction of a feature point of the face by the processor in response to the face being recognized during the face recognition; recognizing a face direction of the face by the processor in response to the feature point of the face being extracted; in response to the face direction being recognized, recognizing a gaze direction of the face based on a recognition module; and correcting by the processor an error that may occur during recognition of the gaze direction by actions causing an error, wherein the recognition module is generated based on appearance-based deep learning and executed by the processor.

According to the disclosure, a change in the gaze direction of a face in successive image frames is suppressed by low-pass filtering. Therefore, an error generated by a behavior including eye blinking, a cough, a tick disorder, and the like, during gaze direction recognition, is corrected. Therefore, an electronic device for recognizing a gaze direction with improved reliability and an operating method of the electronic device are provided.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 10 is a block diagram illustrating an example electronic device in a network environment according to various embodiments;

FIGS. 11A, 11B, 11C and 11D are diagrams illustrating examples of providing a bidirectional service based on a gaze direction as the electronic device is implemented with a television according to various embodiments;

DETAILED DESCRIPTION

Hereinbelow, various example embodiments of the disclosure will be described in greater detail.

Figure 1:
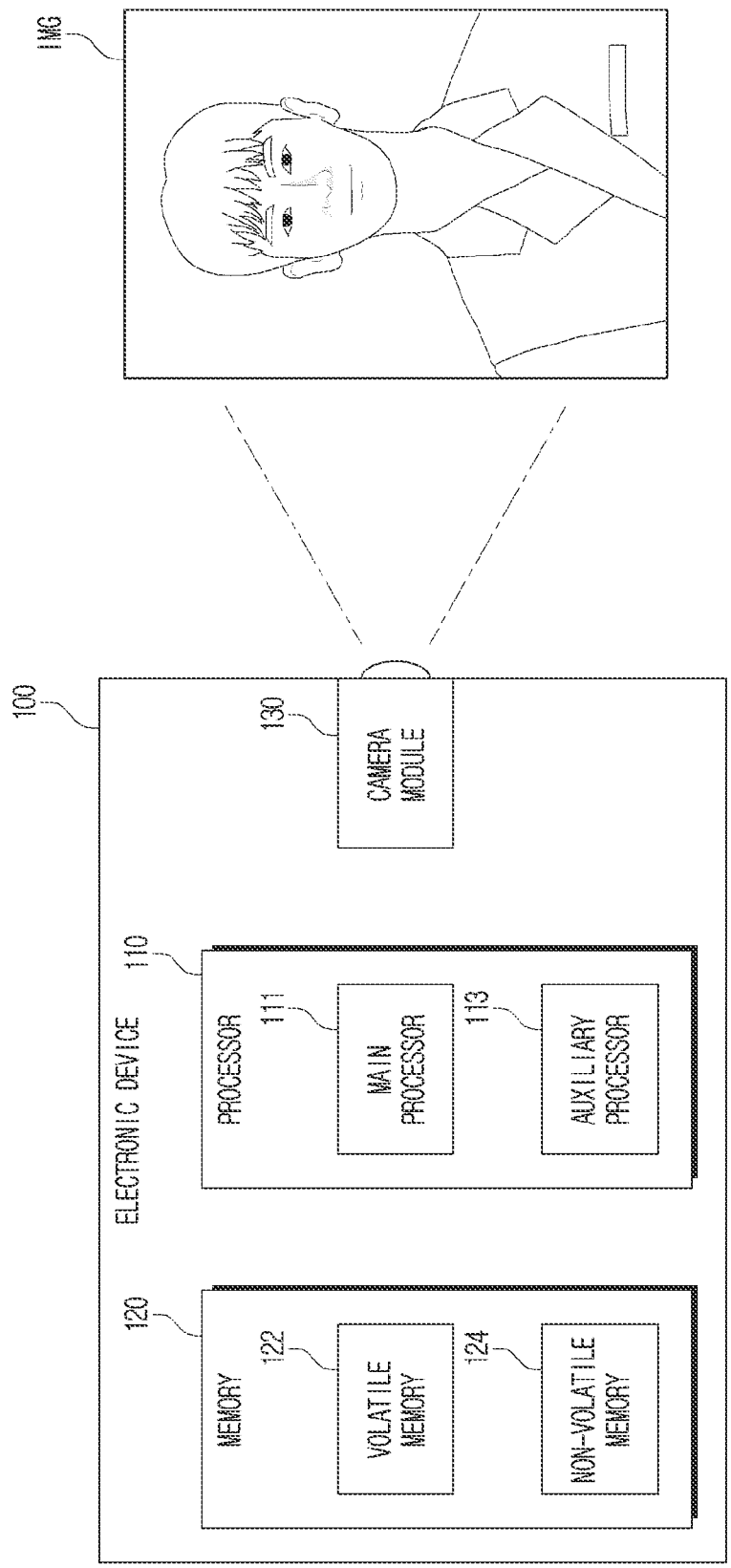
FIG. 1 is a block diagram illustrating an example configuration of an electronic device according to various embodiments.

FIG. 1 is a block diagram illustrating an example configuration of an electronic device 100 according to various embodiments. Referring to FIG. 1, the electronic device 100 may include a processor (e.g., including processing circuitry) 110, a memory 120, and a camera module (e.g., including a camera) 130. The processor 110 may execute an operating system, middleware, or applications of the electronic device 110. The processor 110 may include various processing circuitry including, for example, a main processor 111 and an auxiliary processor 113. The main processor 111 may include, for example, and without limitation, a central processing unit (CPU), an application processor (AP), or the like.

The auxiliary processor 113 may include, for example, and without limitation, a graphic processing unit (GPU), a neural processing unit (NPU), a neuromorphic processor, an image signal processor (ISP), a digital signal processor (DSP), a dedicated processor, a sensor hub processor, a communication processor, or the like. The auxiliary processor 113 may process a part of the operations of the main processor 111 upon a request of the main processor 111.

The memory 120 may be used to store data. The memory 120 may include a volatile memory 122 and a non-volatile memory 124. The volatile memory 122 may include various memories, such as static random access memory, dynamic random access memory, phase change random access memory, ferroelectric random access memory, magnetic random access memory, resistive random access memory, and the like. The volatile memory 122 may be used as a main memory of the electronic device 100. For example, the volatile memory 122 may temporarily store codes executed by an operating system, middle ware, or applications. The volatile memory 122 may temporarily store data generated by an operating system, middle ware, or applications. The non-volatile memory 124 may include various non-volatile memories, such as NAND flash memory, phase change memory, ferroelectric memory, magnetic memory, or resistive memory. The non-volatile memory 124 may be used as an auxiliary memory of the electronic device 100. For example, the non-volatile memory may store an original of codes executed by an operating system, middle ware, or applications. The non-volatile memory may store an original of data generated by an operating system, middle ware, or applications.

The camera module 130 may include a camera and capture a still image or a moving image. The camera module 130 may generate an image (IMG) corresponding to a determined resolution to one image frame of the still image or the moving image. Hereinafter, the IMG may refer to one image frame among image frames of the moving image, but it does not limit the technical spirit of the disclosure.

Based on the IMG frame generated by the camera module 130, the processor 110 may perform face recognition. The face recognition may be performed based on a knowledge-based method or feature-based method. For example, the face recognition may be performed based on deep learning.

The processor 110 may recognize (or estimate) the gaze direction based on the face recognized in the IMG frame. The recognition of the gaze direction may be performed based, for example, and without limitation, on a model-based method or an appearance-based method.

The model-based method may use a geometrical model of the eye. The model-based method may include a corneal-reflection-based method or a shape-based method. The corneal-reflection-based method may illuminate light toward the corneal of the identified user and may recognize (or estimate) the gaze direction using the light direction reflected from the corneal. The shape-based method is based on the shape of the pupil and may recognize (or estimate) the gaze direction based on the center position of the pupil.

The model-based method may be based on a geometrical feature of the face and eyes, and it is required that the resolution of the IMG frame is greater than or equal to a reference value. If the resolution of the IMG frame is less than the reference value, the processor 110 may fail to identify the geometrical feature of the eye included in the IMG frame. For example, recognition (or estimation) of the gaze direction may fail.

The appearance-based method may not use the geometrical feature (e.g., using by extracting or identifying) of the eyes in the face included in the IMG frame. The appearance-based method may recognize (or estimate) the gaze direction using only the image data of the eyes in the face included in the IMG frame. Therefore, even if the resolution of the IMG frame is lower than the reference value, the processor 110 may be successful in recognizing (or estimating) the gaze direction.

The appearance-based method may be performed using a recognition model trained based on deep learning. The appearance-based method may recognize (or estimate) the gaze direction based on the image of the face recognized in the IMG frame. When the face on the IMG frame blinks the eyes, the processor 110 of the appearance-based method may generate an error in the gaze direction recognition (or estimation). In order to correct errors occurring due to the eye blinking, there may be an attempt to recognize the eye blinking.

Eye blinking may indicate an operation of making the eyelid down and up using various muscles around the eyes including the orbicularis oculi and levator palpebrae superioris. The eye blinking may include spontaneous blinking generated by an apparent external stimulus, and reflex blinking generated by sudden changes in light, contact of the cornea, sudden emergence of an object, and the like.

When the user is an adult, eye blinking may be performed by at least 2 to 4 times per minute and an average of 15 to 20 times per minute. In an environment with strong wind or dry environment, the number of eye blinking may increase, and if a user intensively gazes a specific object, the number of eye blinking may decrease. The time required for one time of eye blinking may be 100 ms to 400 ms on average.

A method of recognizing the eye blinking may include an intrusive method and a non-intrusive method. The intrusive method may use a separate device installed to recognize the eye blinking. For example, the intrusive method may include a method of measuring a safety record (electrooculography (EOG)) using at least one electrode, a method of using the Doppler sensor, and a method of using glasses to which a camera observing the eye is attached.

The non-intrusive method may not require a separate device installed to recognize the eye blinking. The non-intrusive method may recognize the eye blinking using an IMG frame of a face that includes the eye. For example, a non-intrusive method may identify landmarks around the eye, identify a distance between the upper eyelid and the lower eyelid based on the landmarks, and recognize the eye blinking based on the identified distance. However, the identification of landmarks requires a high amount of computation and recognizing eye blinking by non-intrusive method requires a high frame rate. Even after the user on the IMG frame blinks eyes, the eye blinking may be identified. Therefore, using the non-intrusive method, it is difficult to recognize the eye blinking in real time, and thus it may be difficult to correct errors occurring due to the eye blinking in real time.

In an appearance-based gaze direction recognition method, without having to separately recognize the eye blinking, the disclosure may provide an operating method of the electronic device 100 to robustly recognize (or estimate) the direction of the user's gaze on the IMG frame by correcting the error of the gaze direction recognition (or estimation) caused by the eye blinking of the user on the IMG frame. By suppressing errors in the direction of gaze caused by the eye blinking of the user on the IMG frame, the electronic device 100 may provide the user with various services based on the gaze direction with high reliability.

In the disclosure, various embodiments are described as suppressing (or compensating) the error in the direction of gaze that occurs due to the eye blinking. However, embodiments of the disclosure are not limited to being associated with the eye blinking. The embodiments of the disclosure may be applied to suppress (or compensate) an error in the gaze direction that occurs due to unexpected movements caused by accidental behaviors, such as, for example, and without limitation, blinking of eye, cough, tick disorder, or the like, that may cause error in the gaze direction recognition based on the appearance-based method.

Figure 2:
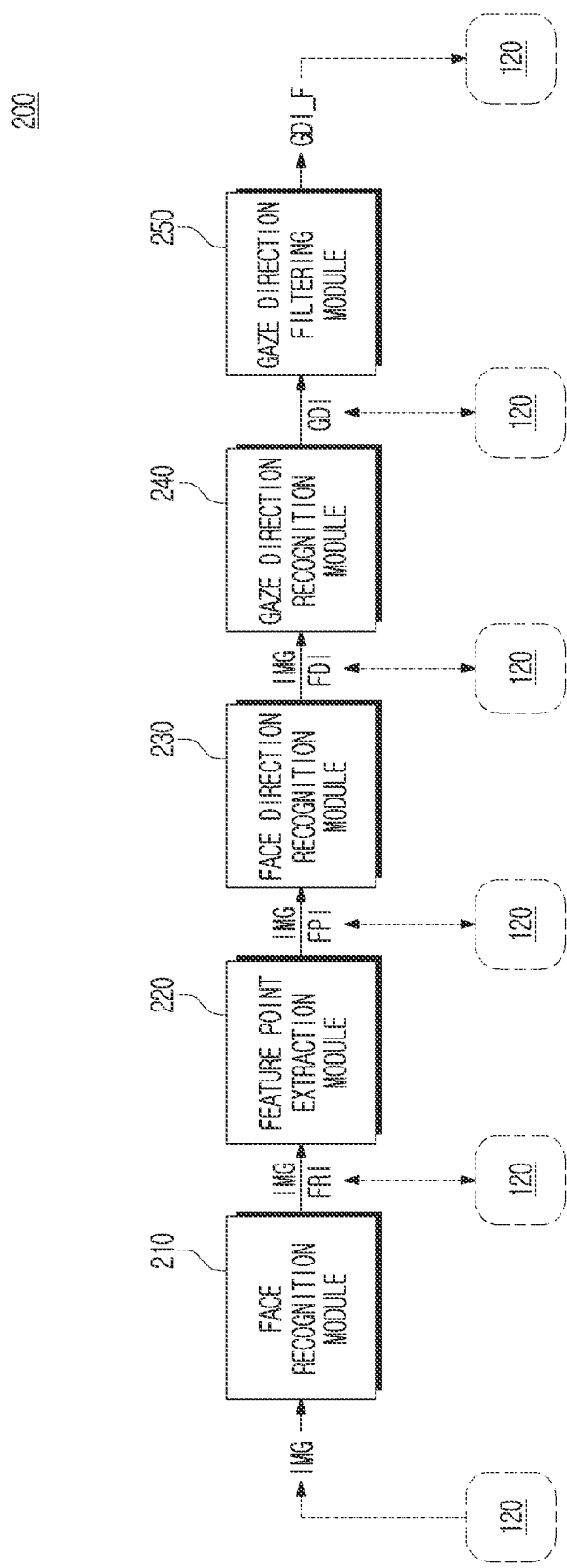
FIG. 2 is a diagram illustrating example modules executed by a processor according to various embodiments.

FIG. 2 is a diagram illustrating example modules 200 executed by the processor 110. For example, each of the modules 200 may be implemented in hardware, software executed in hardware, or a combination of software and hardware. Referring to FIG. 2, the modules 200 may include a face recognition module 210, a feature point extraction module 220, a face direction recognition module 230, a gaze direction recognition module 240, and a gaze direction filtering module 250.

Referring to FIGS. 1 and 2, the camera module 130 may generate the IMG frame. The IMG frame may be stored in the memory 120 through the processor 110 or bypassing the processor 110.

The face recognition module 210 executed by the processor 110 may receive an IMG frame from the memory 120. The face recognition module 210 may recognize (or infer) whether a face is included in the IMG frame by performing face recognition on the IMG frame. The face recognition module 210 may be a module trained to recognize (or infer) a face based on deep learning. The face recognition module 210 may recognize the face from the IMG frame based on deep learning.

If the face recognition is successful, the face recognition module 210 may generate face recognition information (FRI) indicating the recognized face. For example, the FRI may be included (added) in the IMG as the meta information of the IMG. For example, the face recognition module 210 may store the FRI in the memory 120.

The feature point extraction module 220 may receive the IMG frame and face recognition information FRI from the memory 120. The feature point extraction module 220 may extract feature points of the face on the IMG frame by performing feature point extraction based on the IMG frame and FRI. The feature points may be points that are specifically shown in an image of a face of the IMG frame. The feature points are not related to geometric features of the model-based method, and may be characteristic points shown in the image itself of the face.

For example, the feature point extraction module 220 may be a module trained to extract feature points based on deep learning. The feature point extraction module 220 may extract feature points from the face of the IMG frame based on deep learning. Upon successful feature extraction, the feature point extraction module 220 may generate feature point information (FPI) representing feature points. For example, the FPI may be included (e.g., added) in the IMG frame as meta information of the IMG frame. For example, the FPI may include face recognition information FRI as meta information of the IMG frame. For example, the feature point extraction module 220 may store the feature point information FPI in the memory 120.

The face direction recognition module 230 may receive the IMG frame and the feature point information FPI from the memory 120. The face direction recognition module 230 may perform face direction recognition based on the IMG frame and the FPI to recognize (or infer) the face direction included in the IMG frame. For example, the face direction recognition module 230 may execute a particular algorithm to generate a three-dimensional image of a face from a two-dimensional image of the face of the IMG frame based on the feature points.

The face direction may be represented by a rotation vector and a transition vector. The rotation vector is a three-dimensional vector and may indicate that the face has been rotated in which direction and which degree (e.g., in units of degrees) based on when the front of the face is exposed on the IMG frame. The transition vector is a three-dimensional vector and may indicate in which direction (e.g., horizontal direction, vertical direction, or depth direction of the IMG) and which degree the face is moved on the IMG. The face direction recognition module 230 may generate the face direction information (FDI) including a rotation vector and a transition vector. For example, the FDI may be included (e.g., added) in the IMG frame as meta information of the IMG frame. For example, the face direction information FDI may include the feature point information FPI as meta information of the IMG frame. For example, the face direction recognition module 230 may store the face direction information FDI in the memory 120.

The gaze direction recognition module 240 may receive the IMG frame and the PIM from the memory 120. The gaze direction recognition module 240 may perform gaze direction recognition based on the IMG frame and the FDI to recognize (or infer) the gaze direction of the face included in the IMG frame.

For example, the gaze direction recognition module 240 may be a module trained to recognize (or infer) a gaze direction based on a deep learning algorithm. The gaze direction recognition module 240 may recognize (or infer) the gaze direction of the face of the IMG frame based on deep learning. The gaze direction recognition module 240 may generate gaze direction information (GDI) indicative of the gaze direction. For example, the GDI is a meta-information of the IMG frame, which may be included (e.g., added) in the IMG frame. For example, the GDI is a meta-information of the IMG frame, may include the FDI. For example, the gaze direction recognition module 240 may store the GDI in the memory 120.

The gaze direction filtering module 250 may receive the GDI from the memory 120. The gaze direction filtering module 250 may perform filtering on the GDI, and may correct the error generated by the eye blinking of the face included in the IMG frame. For example, the gaze filtering module 250 may compensate for errors in the gaze direction by limiting the degree to which the GDI points between successive image frames changes. For example, the gaze direction filtering module 250 may compensate for the error of eye blinking by performing a low pass filtering (LPF) to remove the high-frequency component from the GDI of successive image frames. The gaze direction filtering module 250 may store the filtered gaze information (GDI_F) in the memory 120.

For example, when the GDI includes a variety of information such as face recognition information (FRI), feature point information (FPI), face direction information (FDI), as meta information of the IMG frame, the gaze direction filtering module 250 may perform filtering only on information indicating the gaze direction in the GDI. For example, the gaze filtering module 250 may perform filtering by receiving the GDI directly from the gaze recognition module 240, instead of receiving the GDI from the memory 120.

Figure 3:
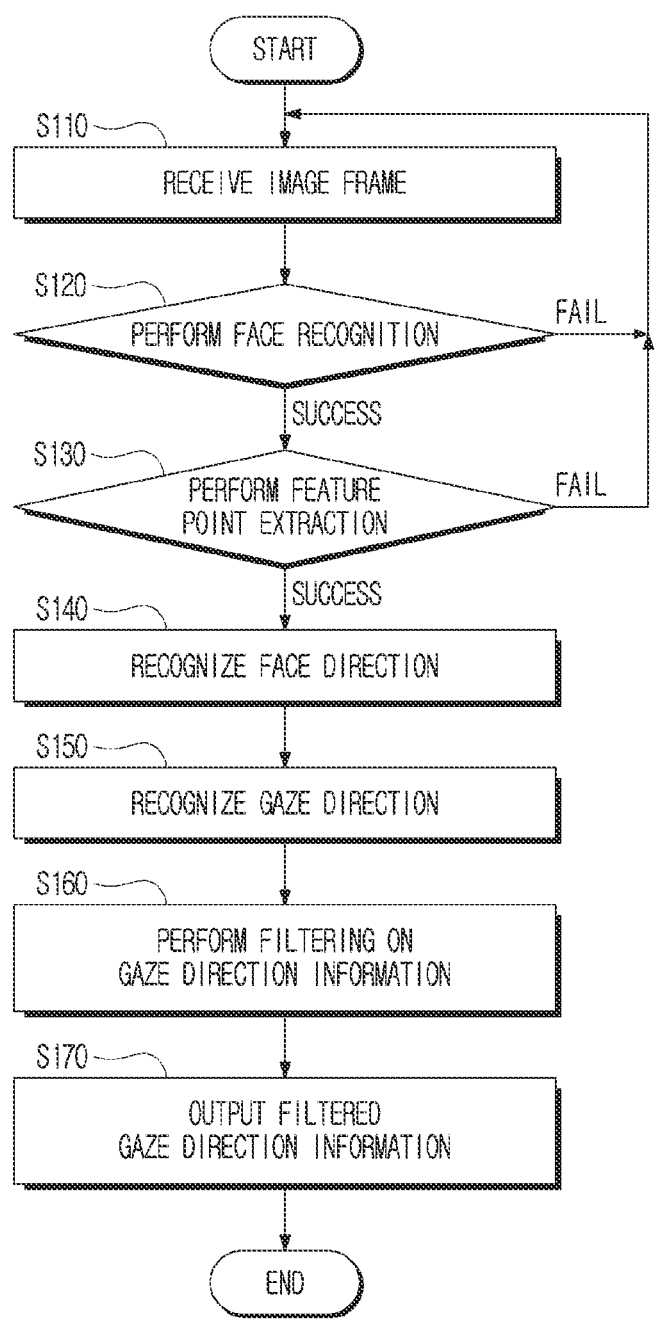
FIG. 3 is a flowchart illustrating an example method in which an image frame is processed by the modules of FIG. 2 executed by the processor of FIG. 1 according to various embodiments.

FIG. 3 is a flowchart illustrating an example method in which an image frame is processed by the modules 200 of FIG. 2 executed by the processor 110 of FIG. 1 according to various embodiments. FIGS. 4A, 4B, 4C, 4D, 4E and 4F are diagrams illustrating examples of a process in which an image frame is processed by the method of FIG. 3 according to various embodiments.

Referring to FIGS. 1, 2, 3, and FIG. 4A, the face recognition module 210 executed by the processor 110 in operation S110 may receive the IMG frame.

In operation S120, the face recognition module 210 may perform facial recognition in the IMG frame. If the face recognition fails, for example, if the face is not recognized in the IMG frame, the IMG frame may be determined to be an image frame that does not include the face. Therefore, subsequent processor related to face recognition may be omitted and in operation S110, processes related to face recognition with respect to a next image frame may be performed. Therefore, subsequent processes associated with facial recognition are omitted, and processes associated with facial recognition may be performed for the next image frame in operation S110.

If the face recognition is successful, for example, if the face is recognized in the IMG frame, subsequent processes associated with facial recognition may be performed. For example, the facial recognition module 210 may succeed in the recognition of the face in the IMG frame of FIG. 4A. If the recognition of the face is successful, face recognition information (FRI) may be generated and may be stored in the memory 120.

Referring to FIGS. 1, 2, 3, and 4B, in operation S130, the feature point extraction module 220 may perform feature point extraction on the face recognized in the IMG frame. If feature point extraction fails, subsequent processes associated with face recognition may be omitted, and processes associated with facial recognition for the next image frame in operation S110 may be performed.

Figure 4A:
FIGS. 4A, 4B, 4C, 4D, 4E and 4F are diagrams illustrating examples of a process in which an image frame is processed by the method of FIG. 3 according to various embodiments.
Figure 4B:
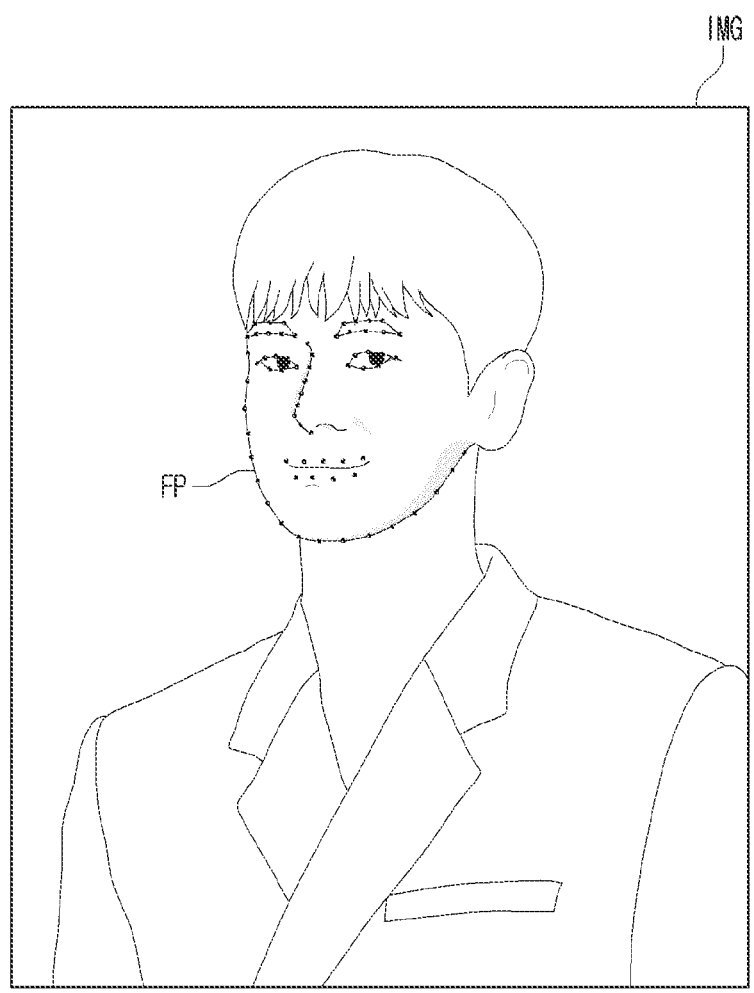
Figure 4C:
Figure 4D:
Figure 4E:
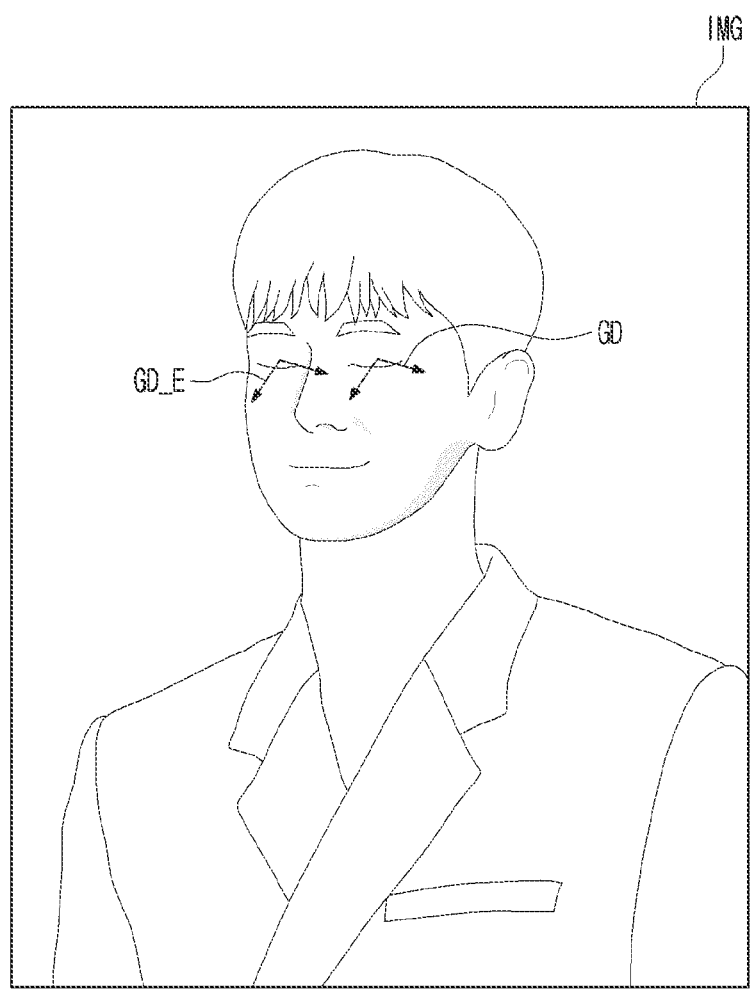
Figure 4F:
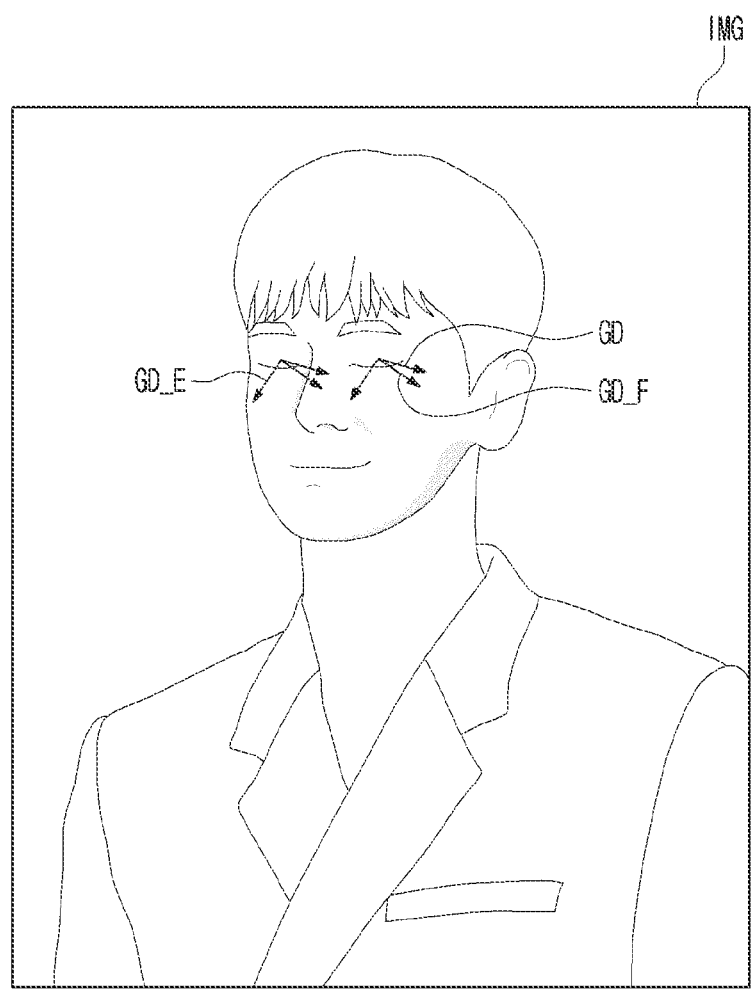

If the feature point extraction is successful, as shown in FIG. 4B, feature points FP may be generated at the face of the IMG frame. For example, the feature points FP may be generated, for example, in the periphery of the eye, eyelash, the nose, upper lip, lower lip, and the contour of the face. If the feature point extraction is successful, the feature point information (FPI) may be generated and stored in the memory 120.

Referring to FIGS. 1, 2, 3, 4B, and 4C, in operation S140, the face direction recognition module 230 may recognize (or infer) the face direction FD based on the feature points FP. If the recognition of the face direction FD is successful, the FDI may be generated and stored in the memory 120. For example, a rotation vector of the FDI and an example of a rotation vector among the transition vectors are displayed as the FD in FIG. 4C.

Referring to FIGS. 1, 2, 3 and 4D, in operation S150, the gaze direction recognition module 240 may recognize (or infer) the gaze direction GD from the image of the eye (or pupil) of the face of the IMG frame. Similar to the FD, the gaze direction may also be expressed as at least one three-dimensional vector. In order to prevent the drawing from being unnecessarily complicated, the gaze direction GD may be briefly represented in the form of a total sum of vectors. If recognition of the gaze direction is successful, the GDI may be generated and stored in the memory 120.

Referring to FIGS. 1, 2, 3 and 4E, an error may occur to recognize the GD when the IMG frame includes the eye blinking. For example, the GD represents the recognized gaze direction before the eye blinking occurs. An erroneous gaze direction GD_E represents the gaze direction that is recognized while the eye blinking occurs. Even though the user holds the gaze direction while the eye blinking occurs, the GD_E may be recognized in the gaze direction recognition module 240.

As the GD_E is recognized, the reliability of the gaze direction recognition module 240 is degraded. It seems difficult to provide a service based on the result of recognition of the gaze direction recognition module 240.

Referring to FIGS. 1, 2, 3 and 4F, in operation S160, the gaze direction filtering module 250 may perform filtering on the GDI. The gaze direction filtering module 250 may correct the recognized GD_E in the gaze direction recognition module 240 to generate a filtered gaze direction GD_F. The GD_F may be closer to the GD corresponding to the actual gaze direction than the GD_E.

For example, the gaze direction filtering module 250 may correct an error in the gaze direction by limiting the direction in which the gaze direction indicated by the GDI is changed between consecutive image frames. For example, the gaze direction filtering module 250 may correct an error in the eye blinking by performing low pass filtering (LPF) to remove high frequency components in the GDI of consecutive image frames.

In operation S170, the gaze direction filtering module may output the GDI_F indicating the GD_F and store the information in the memory 120.

Figure 5:
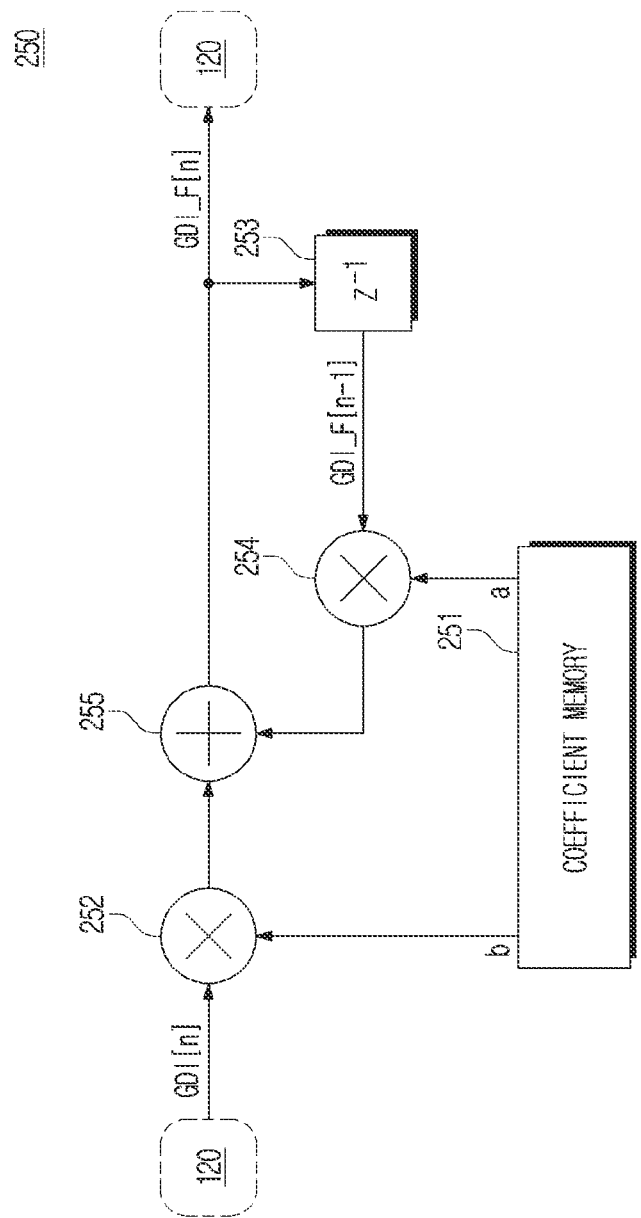
FIG. 5 is a diagram illustrating an example of a gaze direction filtering module according to various embodiments.

FIG. 5 is a diagram illustrating an example configuration of a gaze direction filtering module 250 according to various embodiments. Referring to FIGS. 1, 2 and 5, the gaze direction filtering module 250 may include a coefficient memory 251, a first multiplier 252, a delay 253 (Z−1), a second multiplier 254, and an adder 255. For example, the gaze direction filtering module 250 may be implemented as a primary infinite impulse response (IIR) filter. However, the gaze direction filtering module 250 of the disclosure is not limited to a primary IIR filter, and may be implemented with various types of filters.

The coefficient memory 251 may store a first filtering coefficient (a) and a second filtering coefficient (b). For example, the value of the first filtering coefficient (a) and the value of the second filtering coefficient (b) may be dynamically adjusted. The value of the first filtering coefficient (a) and the value of the second filtering coefficient (b) may be adjusted in response to the user setting. The value of the first filtering coefficient (a) and the value of the second filtering coefficient (b) may be adjusted based on the policy of the operating system or application of the electronic device 100. The coefficient memory 251 may output the stored first filtering coefficient (a) and the second filtering coefficient (b).

The first multiplier 252 may receive the $n^{th}$ gaze direction information (GDI [n]) of the $n^{th}$ image frame (e.g., IMG[n]) (here, n is an integer representing the order in time) from the gaze direction recognition module 240 (or from memory 120), and may receive a second filtering coefficient (b) from the coefficient memory 251. The first multiplier 252 may multiply the $n^{th}$ gaze direction information (GDI[n]) by the second filtering coefficient (b) and may output the value. For example, the first multiplier 252 may multiply the second filtering factor (b) by each of the values (e.g., size values) of the three-directions corresponding to the three-dimensional coordinate system of the $n^{th}$ gaze direction information (GDI[n]).

The delay 253 (or the delay unit 253) may delay the output of the gaze direction filtering module 250. For example, when the $n^{th}$ gaze direction information GDI[n] is input to the gaze direction filtering module 250, the delayer 253 may output the n−$1^{th}$ filtered gaze direction information GDI_F[n−1].

The second multiplier 254 may receive the n−$1^{th}$ filtered gaze direction information GDI_F[n−1] from the delay 253 and may receive the first filtering coefficient (a) from the coefficient memory 251. The second multiplier 254 may multiply and output the value of the n−$1^{th}$ filtered gaze direction information GDI_F[n−1] and the first filtering coefficient (a). For example, the second multiplier 254 may multiply the first filtering coefficient (a) by each of the values of three directions (e.g., size values) corresponding to the three-dimensional coordinate system of the n−$1^{th}$ filtered gaze direction information GDI_F[n−1].

The adder 255 may receive the output of the first multiplier 252 and the output of the second multiplier 254. The adder 255 may add the output of the first multiplier 252 and the output of the second multiplier 254 to output the $n^{th}$ filtered gaze direction information GDI_F[n]. For example, the adder 255 may add three directional values (e.g., size values) corresponding to the three-dimensional coordinate system of the output of the first multiplier 252 and three directional values (e.g., size values) corresponding to the three-dimensional coordinate system of the output of the second multiplier 254, respectively. The $n^{th}$ filtered gaze direction information GDI_F[n] output from the adder 255 may be stored in the memory 120.

Figure 6:
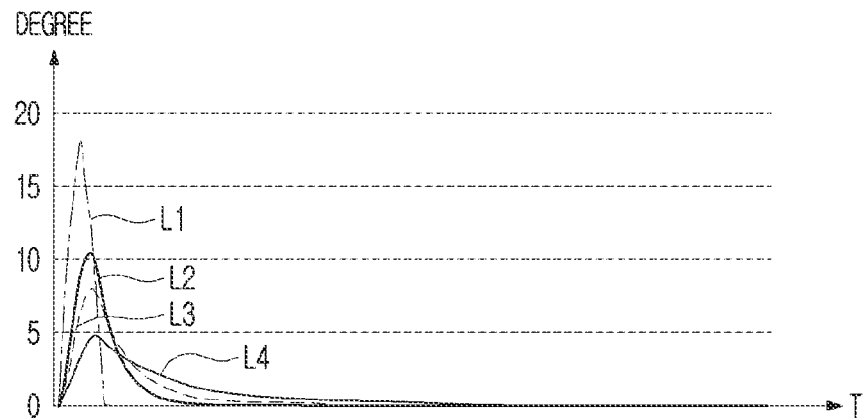
FIG. 6 is a graph illustrating a measurement result in which a gaze direction filtering module corrects an error of an eye blinking according to a filtering coefficient according to various embodiments.

FIG. 6 is a graph illustrating a measurement result in which the performance of correcting the error of the eye blinking of the gaze direction filtering module 250 is different according to various embodiments. Referring to FIG. 6, the horizontal axis indicates a time T (e.g., a frame number of an IMG frame), and the vertical axis represents a degree. For example, when the actual gaze direction is fixed and the eye blinking occurs, the difference between the actual gaze direction (e.g., GD) and the GD_F may be indicated as the degree in the vertical axis (see FIG. 4F).

Referring to FIGS. 1, 2, 5 and 6, the first line L1 shows an example when the first filtering coefficient a is 0.0 and the second filtering coefficient b is 1.0, for example, when the gaze direction filtering module 250 is deactivated. The second line L2 shows an example when the first filtering coefficient a is 0.1 and the second filtering coefficient b is 0.9. The third line L3 shows an example when the first filtering coefficient a is 0.2, and the second filtering coefficient b is 0.8. The fourth line L4 shows an example when the first filtering coefficient a is 0.3 and the second filtering coefficient b is 0.7.

As the value of the first filtering coefficient a increases or the value of the second filtering coefficient b decreases, the specific percentage of the $n^{th}$ gaze direction information GD[n] is reduced among the $n^{th}$ filtered gaze direction information GDI_F[n] and the specific percentage of the n−$1^{th}$ filtered gaze direction information GDI_F[n−1] is increased. The change of the $n^{th}$ filtered gaze direction information GDI_F[n] is further suppressed, and the high frequency component is further suppressed. Thus, an error that occurs due to eye blinking may be further suppressed.

Figure 7:
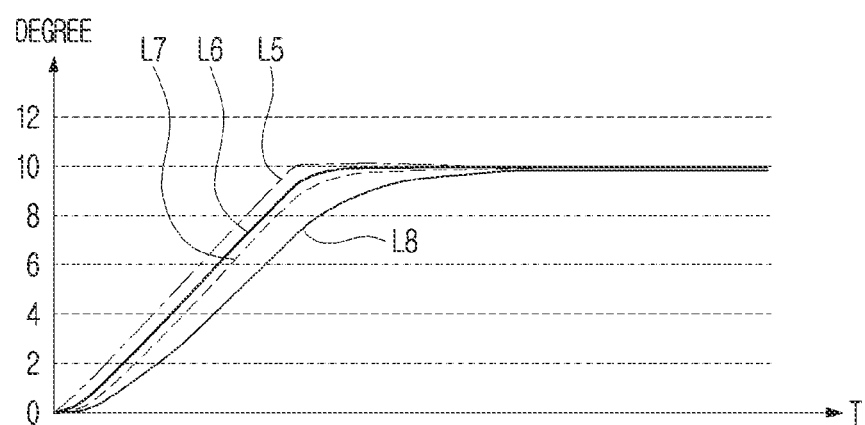
FIG. 7 is a graph illustrating a measurement result in which the performance of tracking a gaze direction (GD) of the gaze direction filtering module becomes different according to a filtering coefficient according to various embodiments.

FIG. 7 is a graph illustrating a measurement result that the performance of tracking of a gaze direction by the gaze direction filtering module is different according to the filtering coefficient according to various embodiments. Referring to FIG. 7, the horizontal axis represents to time (T) (e.g., frame number of the IMG frame) and the vertical axis represents degree. For example, when the actual gaze direction changes without eye blinking, the difference between the actual gaze direction and the GD_F may be represented in a vertical axis as a degree.

Referring to FIGS. 1, 2, 5 and 7, the fifth line L5 shows an example when the first filtering coefficient a is 0.0 and the second filtering coefficient b is 1.0, for example, when the gaze direction filtering module 250 is deactivated. The sixth line L6 shows an example when the first filtering coefficient a is 0.1 and the second filtering coefficient b is 0.9. The seventh line L7 shows an example when the first filtering coefficient a is 0.2, and the second filtering coefficient b is 0.8. The eighth line L8 shows an example when the first filtering coefficient a is 0.3 and the second filtering coefficient b is 0.7.

As the value of the first filtering coefficient a increases or the value of the second filtering coefficient b decreases, the specific percentage of the $n^{th}$ gaze direction information GD[n] is reduced among the $n^{th}$ filtered gaze direction information GDI_F[n] and the specific percentage of the n−$1^{th}$ filtered gaze direction information GDI_F[n−1] is increased. The change of the $n^{th}$ filtered gaze direction information GDI_F[n] is further suppressed, and the high frequency component is further suppressed.

Figure 8:
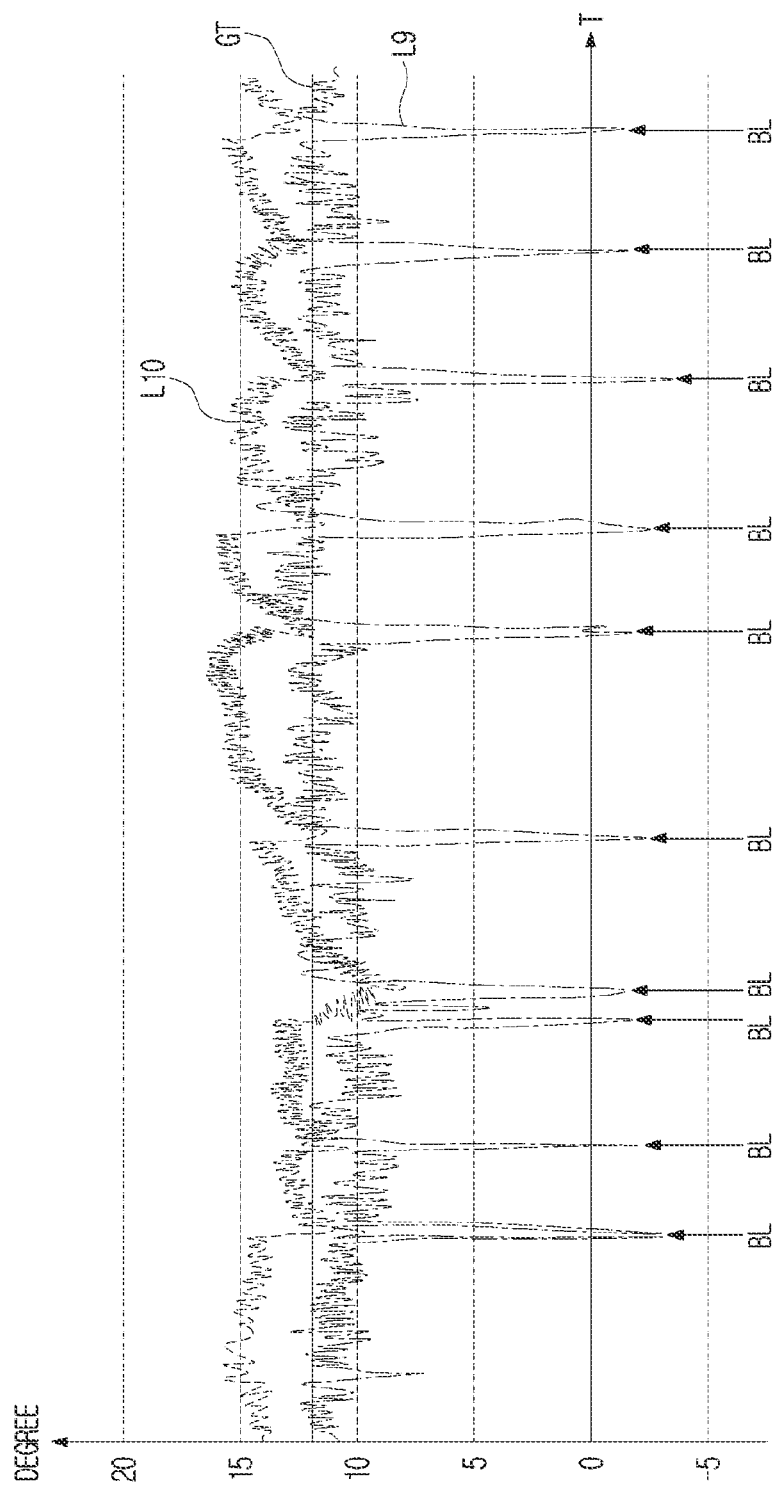
FIG. 8 is a graph illustrating a measurement result in which an error due to eye blinking is suppressed by a gaze direction filtering module when an actual gaze direction is fixed according to various embodiments.

FIG. 8 is a graph illustrating a result of the measurement of suppressing an error due to eye blinking by the gaze direction filtering module 250 when the actual gaze direction is fixed according to various embodiments. Referring to FIG. 8, the horizontal axis indicates a time T (e.g., a frame number of an IMG frame), and the vertical axis represents a degree.

Referring to FIGS. 1, 2, 5 and 8, the ground truth (GT) represents the actual gaze direction. The actual gaze direction may be fixed. The ninth line L9 shows the GDI_F when the gaze direction filtering module 250 is deactivated. The tenth line L1 shows the GDI_F when the gaze direction filtering module 250 is activated.

When the eye blinking (BL) occurs, the ninth line L9 may have a large error with the ground truth (GT). Compared to the ninth line L9, when BL occurs, the tenth line L10 may have a relatively small error with the GT. The gaze direction filtering module 250 according to an embodiment may effectively suppress errors caused by eye blinking.

Figure 9:
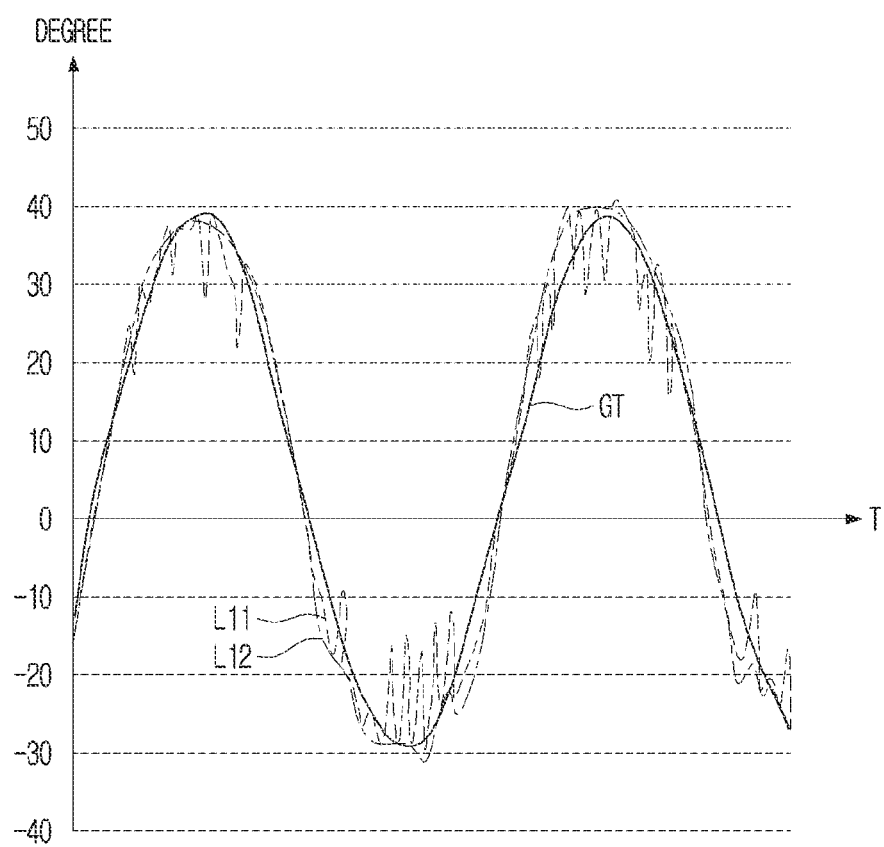
FIG. 9 is a graph illustrating a measurement result of suppressing an error due to eye blinking by the gaze direction filtering module when an actual gaze direction moves according to various embodiments.

FIG. 9 is a graph illustrating a measurement result in which the gaze direction filtering module 250 suppresses an error due to eye blinking when the actual gaze direction is moved according to various embodiments. Referring to FIG. 9, the horizontal axis indicates a time T (e.g., a frame number of an IMG frame), and the vertical axis represents a degree.

Referring to FIGS. 1, 2, 5 and 9, the GT represents the actual gaze direction. The actual gaze direction may move in accordance with the flow of time. The eleventh line L11 shows the GDI_F when the gaze direction filtering module 250 is deactivated. The twelfth line L12 shows the GDI_F when the gaze direction filtering module 250 is activated.

When the eye blinking occurs, $11^{th}$ line (L11) may have a large error from the ground truth (GT). When compared to the $11^{th}$ line (L11), if the eye blinking occurs, 12th line (L12) may have a relatively smaller error with the ground truth GT. The gaze direction filtering module 250 according to an embodiment may effectively restrain an error that occurs by eye blinking.

FIG. 10 is a block diagram illustrating an example electronic device 301 in a network environment 300 according to various embodiments. For example, the electronic device 301 may be an extensive example of the electronic device 100 of FIG. 1.

Referring to FIG. 10, in the network environment 300, the electronic device 301 may communicate with an electronic device 302 via a first network 398 (e.g., a short-range wireless communication network) or communicate with an electronic device 304 or a server 308 via a second network 399 (e.g., wide area network). According to an example embodiment, the electronic device 301 may communicate with the electronic device 304 via the server 308. According to an example embodiment, the electronic device 301 may include a processor 320, a memory 330, an input device 350, an acoustic output module (or audio output module) 355, a display module 360, an audio module 370, a sensor module 376, an interface 377, a connection terminal 378, a haptic module 379, a camera module 380, a power management module 388, a battery 389, a communication module 390, a subscriber identification module (SIM) 396, or an antenna module 397. In various embodiments, at least one (e.g., connection terminal 378) of these components may be omitted from electronic device 301, or one or more other components may be added. In various embodiments, some of these components (e.g., sensor module 376, camera module 380, or antenna module 397) may be implemented as a single component (e.g., a display module 360).

The processor 320 may execute software (e.g., program 340) to control at least one other component (e.g., hardware or software component) of the electronic device 301 coupled to the processor 320, and may perform various data processing or operations. According to an embodiment, as at least a part of the data processing or operation, the processor 320 may store the command or data received from another component (e.g., the sensor module 376 or the communication module 390) to a volatile memory 332, process command or data stored in the volatile memory 332, and store the result data in a non-volatile memory 334. According to an example embodiment, the processor 320 may include a main processor 321 (e.g., a central processing unit or an application processor), or an auxiliary (or secondary) processor 323 (e.g., a graphics processing unit, a neural processing unit (NPU), an image signal processor, a sensor hub processor, or a communication processor) which may be operated together or independently. For example, if the electronic device 301 includes a main processor 321 and a secondary processor 320, the auxiliary processor 323 may use less power than the main processor 321, or may be set to be specialized to a designated function. The auxiliary processor 323 may be implemented separately from, or as a part of, the main processor 321.

The auxiliary processor 323 may, for example, in place of the main processor 321 while the main processor 321 is in an inactive state (for example: sleep) or along with the main processor 321 while the main processor 321 is in an active state (for example: execution of an application) control a part of the functions or states related to at least one component (for example: display module 360, the sensor module 376, or the communication module 390) among the components of the electronic device 301. According to an example embodiment, the auxiliary processor 323 (e.g., an image signal processor or a communication processor) may be implemented as a part of a functionally related other components (e.g., camera module 380 or communication module 390). According to an embodiment, the auxiliary processor 323 (e.g., a neural network processing device) may include a hardware structure specialized for processing an artificial intelligence model. The artificial intelligence model may be generated through machine learning. Such learning may be performed, for example, by the electronic device 301 in which an artificial intelligence model is performed, or may be performed via a separate server (e.g., server 308). The learning algorithms may include, but are not limited to, supervised learning, unsupervised learning, semi-supervised learning, or reinforcement learning. The artificial intelligence model may include a plurality of artificial neural network layers. The artificial neural network may be, but is not limited to, a deep neural network (DNN), a convolutional neural network (CNN), a recurrent neural network (RNN), a restricted Boltzmann machine, a deep belief network (DBN), a bi-directional recurrent deep neural network (BRDNN), deep Q-networks, or a combination of two or more thereof. The artificial intelligence model may additionally or alternatively include a software structure, in addition to the hardware structure.

For example, the processor 320 may correspond to the processor 110 of the electronic device 100 of FIG. 1. The main processor 321 and the auxiliary processor 323 may correspond to the main processor 111 and the auxiliary processor 113 of FIG. 1, respectively.

The memory 330 may store various data used by at least one component (e.g., processor 320 or sensor module 376) of the electronic device 301. The data may include, for example, software (e.g., program 340) and input data or output data related with software instructions. The memory 330 may include the volatile memory 332 or non-volatile memory 334.

For example, the memory 330 may correspond to the memory 120 of the electronic device 100 of FIG. 1. The volatile memory 332 and the non-volatile memory 334 may correspond to the volatile memory 122 and the non-volatile memory 124, respectively.

The program 340 may be stored in the memory 330 as software, and may include, for example, the operating system 342, the middleware 344, or the application 346.

The input module 350 may receive a command or data to be used for the components (e.g., processor 320) of the electronic device 301 from the outside (e.g., user) of the electronic device 301. The input module 350 may include, for example, a microphone, a mouse, or a keyboard (e.g., button), or a digital pen (e.g., a stylus pen).

The sound output module 355 may output a sound signal to the outside of the electronic device 301. The sound output module 355 may include, for example, a speaker or a receiver. The speaker may be used for general purposes, such as multimedia playback or recording playback, and the receiver may be used to receive incoming calls. According to an example embodiment, the receiver may be implemented separately from, or as a part of, the speaker.

The display module 360 may visually provide information to an outside (e.g., user) of the electronic device 301. The display module 360 may include, for example, a display, a hologram device, a projector, or a control circuit for controlling the device. According to an embodiment, the display module 360 may include a touch sensor which is set to detect a touch or a pressure sensor which is set to measure intensity of power generated by the touch.

The audio module 370 may convert sound into an electric signal, or convert an electric signal to sound. According to an example embodiment, the audio module 370 may acquire sound through an input module 350, or output sound through the sound output module 355, or an external electronic device (e.g., electronic device 302) (e.g., speaker or headphone) which is directly or wirelessly connected to the electronic device 301.

The sensor module 376 may detect the operation state of the electronic device 301 (e.g., power or temperature), or an external environment state (e.g., a user state), and generate an electrical signal or a data value corresponding to the detected state. According to an embodiment, the sensor module 376 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 377 may support one or more designated protocols that may be used by the electronic device 301 to be connected directly or wirelessly to an external electronic device (e.g., electronic device 302). According to an embodiment, the interface 377 may include, for example, a high definition multimedia interface (HDMI), a universal serial bus (USB) interface, a secure digital (SD) card interface, or an audio interface.

A connection terminal 378 may include a connector through which the electronic device 301 may be physically connected to an external electronic device (e.g., the electronic device 302). According to an embodiment, the connection terminal 178 may include, for example, an HDMI connector, a USB connector, an SD card connector, or an audio connector (e.g., a headphone connector).

The haptic module 379 may convert an electrical signal into a mechanical stimulus (e.g., vibration or motion) or an electrical stimulus that a user may recognize through a tactile or kinesthetic sense. According to an embodiment, the haptic module 379 may include, for example, a motor, a piezoelectric element, or an electric stimulation device.

The camera module 380 may photograph a still image or a moving image. According to an embodiment, the camera module 380 may include one or more lenses, image sensors, image signal processors, or flashes. For example, the camera module 380 may correspond to the camera module 130 of the electronic device 100 of FIG. 1.

The power management module 388 may manage power supplied to the electronic device 301. According to an embodiment, the power management module 388 may be implemented as, for example, at least a part of power management integrated circuit (PMIC).

The battery 389 may supply power to at least one component of the electronic device 301. According to an embodiment, the battery 389 may include, for example, a non-rechargeable primary battery, a rechargeable secondary battery, or a fuel cell.

The communication module 390 may support establishment of direct (e.g.: wired) communication channel between the electronic device 301 and an external electronic device (e.g., electronic device 302, electronic device 304, or server 308) or wireless communication channel, and communication through the established communication channels. The communication module 390 may include one or more communication processors which are operated independently of the processor 320 (e.g., application processor) and support direct (e.g., wired) communication or wireless communication. According to an embodiment, the communication module 390 may include a wireless communication module 392 (e.g., cellular communication module, near field wireless communication module, or global navigation satellite system (GNSS) communication module) or wired communication module 394 (e.g., local area network (LAN) communication module, or power line communication module). The corresponding communication module among these communication modules may communicate with an external electronic device 304 via the first network 398 (e.g., Bluetooth, wireless fidelity (WiFi) direct or near field communication network such as infrared data association (IrDA)) or the second network 399 (e.g., telecommunication network such as cellular network, Internet, or computer network (e.g., LAN or WAN)). These types of communication modules may be incorporated into one component (e.g., a single chip) or implemented with a plurality of components (e.g., a plurality of chips) that are separate from each other. The wireless communication module 392 may confirm or authenticate the electronic device 301 in the communication network such as the first network 398 or the second network 399 using the subscriber information (e.g., international mobile subscriber identity (IMSI)) stored in the subscriber identification module 396.

The wireless communication module 392 may support a 5G network and a next generation communication technology, e.g., new radio access technology (NR access technology) after a 4G network. The NR connection technology may support high-capacity data high-speed transmission (enhanced mobile broadband (eMBB)), terminal power minimization, massive machine type communications (mMTC), or ultra-reliable and low-latency communications (URLLC). The wireless communication module 392 may support a high frequency band (e.g., an mmWave band), for example, to achieve a high data transmission rate. The wireless communication module 392 may support technologies such as various technologies for securing performance in a high frequency band, e.g., beamforming, massive multiple-input and multiple-output (MIMO), full dimensional MIMO (FD-MIMO), array antenna, analog beam-forming, or large scale antenna. The wireless communication module 392 may support various requirements defined in the wearable electronic device 301, the external electronic device (e.g., the electronic device 304) or the network system (e.g., the second network 399). According to an embodiment, the wireless communication module 392 may support a peak data rate (e.g., at least 20 Gbps) for realizing eMBB, a loss coverage (e.g., 164 dB or less) for mMTC implementation, or a U-plane latency (e.g., downlink (DL) and uplink (UL) by 0.5 ms or below, respectively, or round trip 1 ms or below) for URLLC implementation.

The antenna module 397 may transmit a signal or power to the external device (e.g., external electronic device) or may receive from the outside. According to an embodiment, the antenna module 397 may include an antenna including a conductive body formed on a substrate (e.g., PCB) or a radiator made of a conductive pattern. The antenna module 397 may include a plurality of antennas (e.g., array antenna) and at least one antenna suitable for a communication method used in a communication network, such as the first network 398 or the second network 399, may be selected from the plurality of antennas by, for example, the communication module 390. The signal or power may be transmitted or received between the communication module 390 and an external electronic device through at least one antenna selected above. According to some embodiments, other components (e.g. radio frequency integrated circuit (RFIC)) in addition to a radiator may be further formed as part of the antenna module 397.

According to various embodiments, the antenna module 397 may form an mmWave antenna module. According to an embodiment, the mmWave antenna module may include a printed circuit board, a radio frequency integrated circuit (RFIC) disposed on or adjacent to a first surface (e.g., a lower surface) of the printed circuit board, and capable of supporting a designated high frequency band (e.g., an mmWave band), and a plurality of antennas (e.g., an array antenna) disposed adjacent to or adjacent to a second surface (e.g., top surface or side) of the printed circuit board and capable of transmitting or receiving a signal of the designated high frequency band.

At least a part of the components may be interconnected through the communication method (e.g., bus, general purpose input and output (GPIO), serial peripheral interface (SPI), or mobile industry processor interface (MIPI)) among peripheral devices and exchange a signal (e.g., command or data) from each other.

According to an embodiment, the command or data may be transmitted or received between the electronic device 301 and the external electronic device 304 via the server 308 connected to the second network 399. Each of the external electronic devices 302 and 304 may be devices which are the same or different types from the electronic device 301. According to an embodiment, whole or a part of the operations executed by the electronic device 301 may be executed by one or more external devices among the external electronic devices 302, 304, or 308. For example, when the electronic device 301 has to perform a function or service automatically, or in response to a request from a user or another device, the electronic device 301 may request one or more external electronic devices to perform at least a part of the function or the service instead of, or in addition to, performing the function or service by itself. The one or more external electronic devices that have received the request may execute at least a portion of the requested function or service, or an additional function or service associated with the request, and transmit the result of the execution to the electronic device 301. The electronic device 301 may process the result as is or additionally, and provide the result as at least a portion of the response to the request. For this purpose, for example, cloud computing, distributed computing, or mobile edge computing (MEC), client-server computing technology may be used. The electronic device 301 may provide ultra-low latency services using, for example, distributed computing or mobile edge computing. In another embodiment, the external electronic device 304 may include an Internet of Things (IoT) device. The server 308 may be an intelligent server using machine learning and/or neural networks. According to an embodiment, the external electronic device 304 or server 308 may be included in a second network 399. The electronic device 301 may be applied to an intelligent service (for example, smart home, smart city, smart car, or health care) on the basis of 5G communication technology and IoT-related technology.

As described with reference to FIGS. 1-9, the processor 320 may execute the modules 200 of FIG. 2. The processor 320 may recognize (or estimate) the user's gaze direction through the camera module 380 with improved reliability. The electronic device 301 may provide the user with a bi-directional service using the gaze direction based on the recognized gaze direction.

Figure 11B:
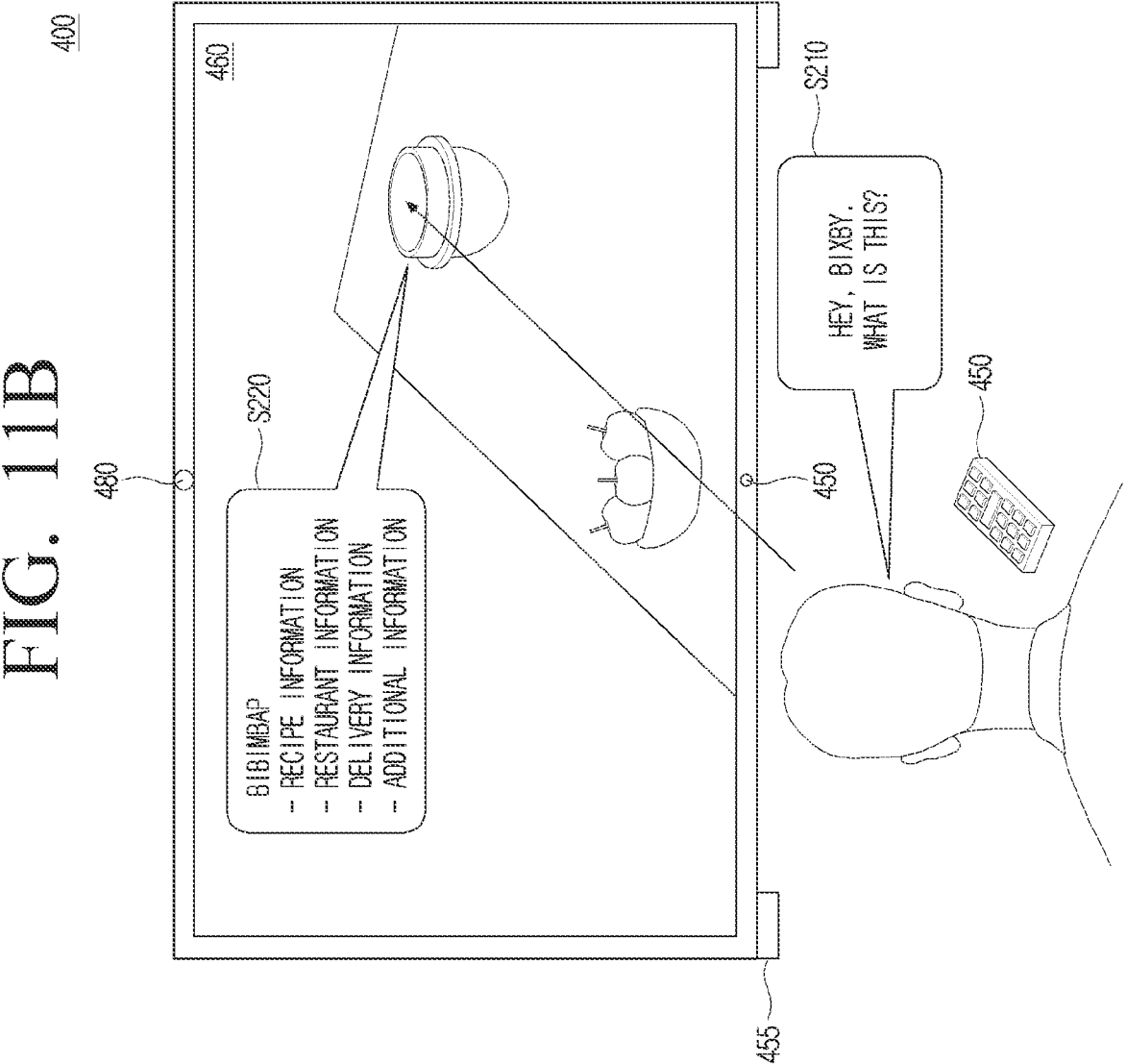

FIGS. 11A, 11B, 11C and 11D are diagrams illustrating examples in which the electronic device 301 is implemented with a smart television 400 to provide a bi-directional service based on the gaze direction. Referring to FIG. 11A, the smart television 400 may include an input module (e.g., including input circuitry) 450, an acoustic (or audio) output module (e.g., including acoustic (or audio) output circuitry) 455, a display module (e.g., including a display) 460, and a camera module (e.g., including a camera) 480.

The input module 450 may include various input circuitry including a microphone coupled to the body of the smart television 400, or a remote controller remotely connected to the smart television 400. The remote controller may include a microphone. The input module 450 may correspond to the input module 350 of FIG. 10.

The acoustic output module 455 may include various acoustic output circuitry including, for example, two or more speakers. The acoustic output module 455 may correspond to the acoustic output module 355 of FIG. 10. The display module 460 may correspond to the display module 360 of FIG. 10. The camera module 480 may correspond to the camera module 380 of FIG. 10. Although omitted in FIG. 11A, the smart television 400 may further include all or a portion of the components of the electronic device 301 described with reference to FIG. 10. For example, the smart television 400 may further include additional components, such as a communication module (corresponding to 390 of FIG. 10) for receiving an image displayed through the display module 460 from an external device.

The smart television 400 may activate or deactivate a gaze tracking mode that tracks the user's gaze direction based on the image frame generated at the camera module 480 in response to the user's command. In response to the gaze tracking mode being activated, the smart television 400 may continuously track the user's gaze direction. Based on the gaze direction filtering module 250 (see FIG. 2), the smart television 400 may correct an error that occurs due to the user's eye blinking. The smart television 400 may track the user's gaze direction with high reliability.

Referring to FIG. 11B, the smart television 400 may start a bi-directional service based on the user's gaze direction information (e.g., filtered gaze direction information (GDI_F) (see FIGS. 2, 3 and 4F) in response to a particular signal (e.g., a command) being generated through the input module 450 from a user. For example, in operation S210, the user may give a command such as "Hey, Bixby, what is this?" requesting information of an object and may request the start of the bi-directional service.

For example, the smart television 400 may receive a command from a user via an input module 450 (e.g., a microphone) provided in the body or the input module 450 (e.g., microphone or button) provided in a remote controller, and may generate a signal corresponding to the command.

In response to the user's command, the smart television 400 may identify the object at the location indicated by the GDI_F on the image displayed by the display module 460. If an object indicated by the GDI_F on the image is not identified, the smart television 400 may output a message (e.g., in the form of voice or text) that indicates that identification fails like "The object cannot be identified."

If the object indicated by the GDI_F on the image is identified, in operation S220, the smart television 400 may display information of the object (e.g., in the form of voice or text). For example, the object indicated by the GDI_F may be "Bibimbap". The smart television 400 may display the Bibimbap, which is the name of the object. The smart television 400 may display the recipe information of Bibimbap, the information of the nearby restaurant selling Bibimbap, the information of the nearby shops to deliver Bibimbap, or additional information associated with Bibimbap such as origin of Bibimbap, the age-specific or gender-specific preference of Bibimbap. For example, the smart television 400 may use a communication module (corresponding to 390 of FIG. 10) to obtain information of the object from an external device, and display the obtained information.

Figure 11C:
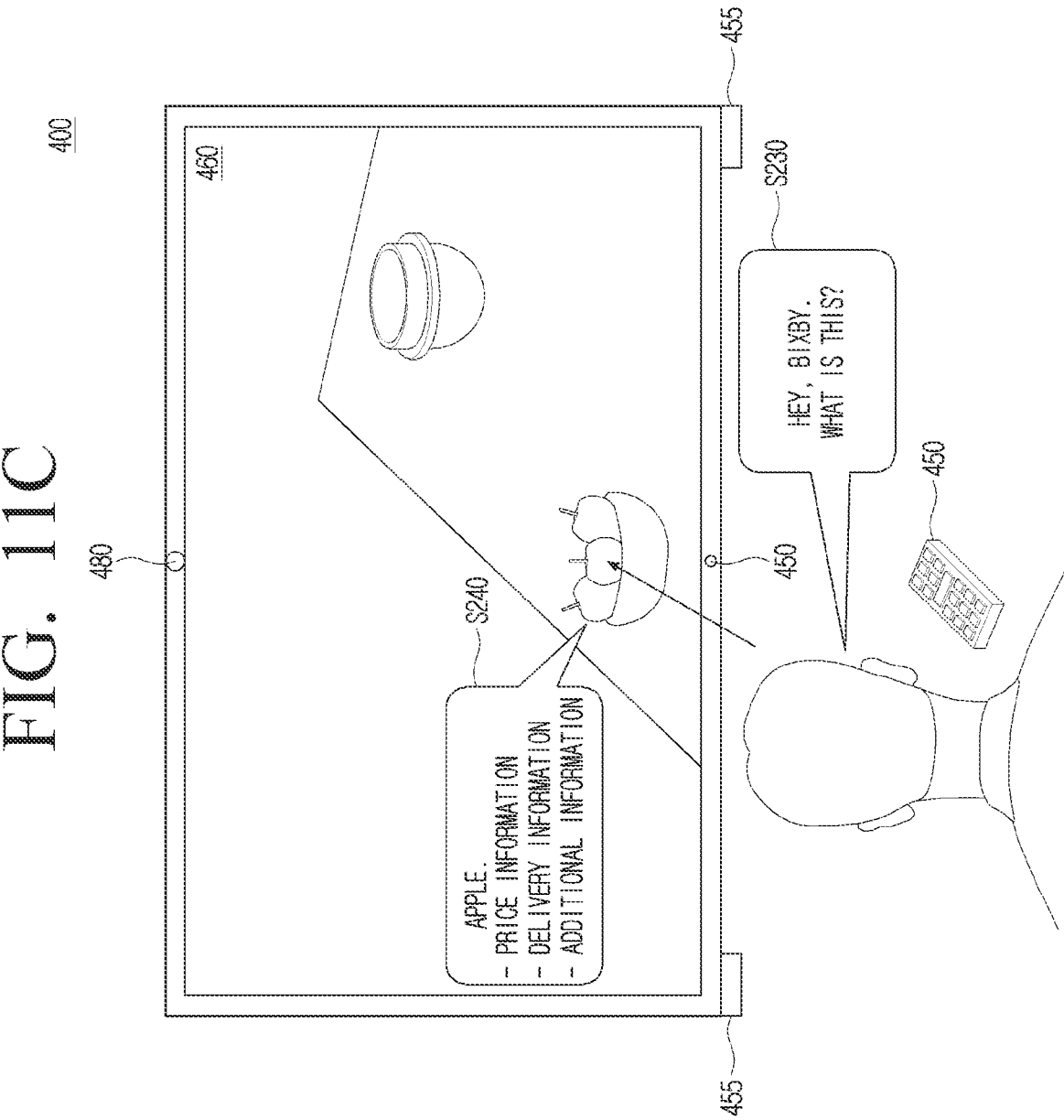

Referring to FIG. 11C, in operation S230, the user may give a command to request information of the object such as "Hey, Bixby! What is this?" In response to the user's command, the smart television 400 may identify an object at a location indicated by the GDI_F on the image displayed by the display module 460.

In operation S240, the smart television 400 may display the information of the object (e.g., in the form of voice or text). For example, the object indicated by the GDI_F may be "Apple". The smart television 400 may display an apple, which is a name of an object. The smart television 400 may display the price information of the nearby store selling the apple, the price information of the nearby store delivering the apple, or the additional information associated with the apple.

After the object is identified, the smart television 400 may execute an additional service in response to an additional command requesting an additional service, not a command to identify an object, being generated. Some of the additional services supported by the smart television 400 may be performed via the communication module 390. For example, some of the additional services may include a payment service. Another portion of the additional services that the smart television 400 supports may be performed without using the communication module 390. For example, another portion of the additional services may include a data storage service.

Figure 11D:
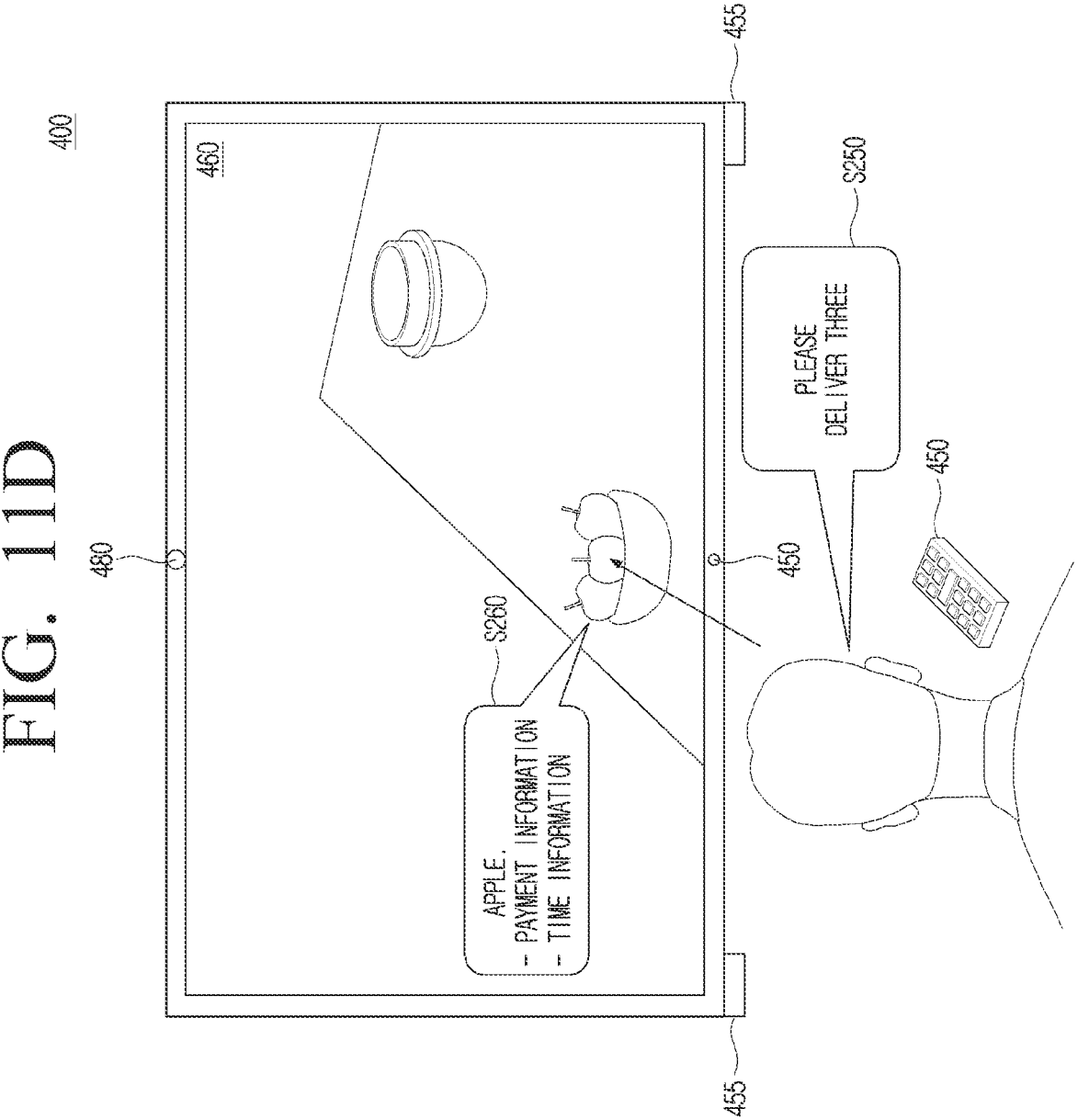

Referring to FIG. 11D, in operation S250, the user may issue a command to request delivery of the object, such as "please deliver three". In response to the user's command, the smart television 400 may request delivery of the object at a location indicated by the filtered gaze direction information GDI_F on the image displayed by the display module 460.

As another example, the smart television 400 may recognize a user's command based on the GD_F. For example, in response to the GD_F staying in a particular text for longer than or equal to a reference time, the smart television 400 may determine that a command corresponding to a particular text is received.

In operation S260, the smart television 400 may perform online payment based on the payment information registered by the user, and display payment information indicating a payment result. The smart television 400 may display time information indicative of the expected time when delivery with the apple is complete.

As described with reference to FIGS. 11A-11D, when the reliability of the GDI_F is guaranteed, the smart television 400 may provide the user with a bi-directional service based on the GDI_F. Therefore, the user's convenience provided by the smart television 400 may be increased.

Figure 12A:
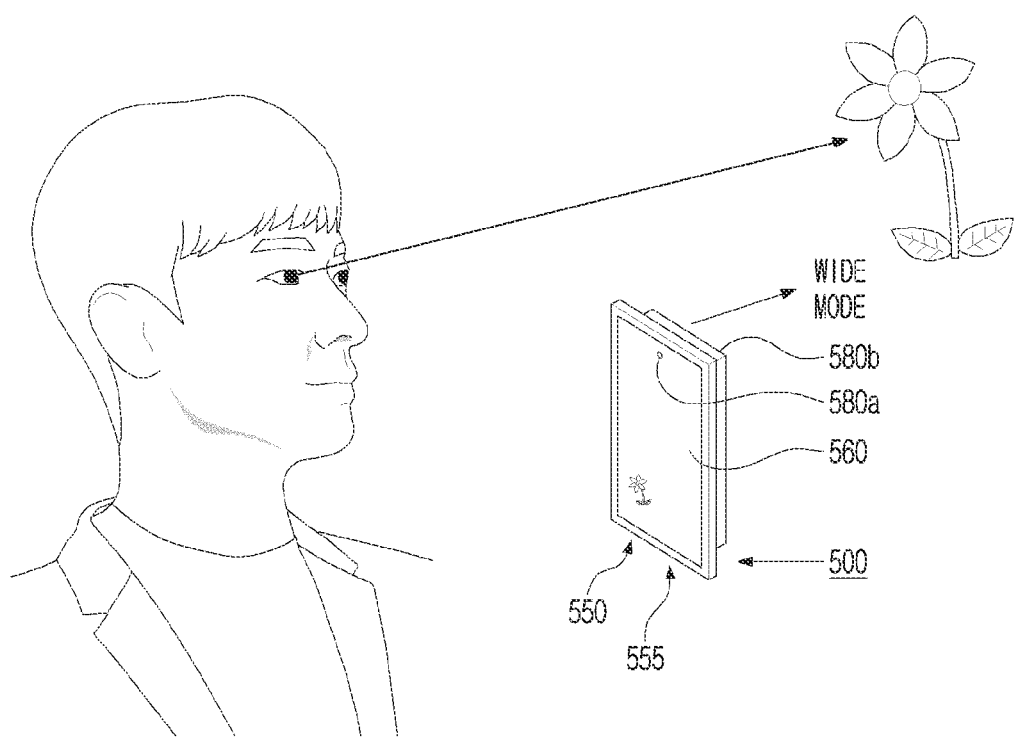
FIGS. 12A, 12B and 12C are diagrams illustrating an example of providing a bidirectional service based on a gaze direction as the electronic device is implemented with a smartphone according to various embodiments.
Figure 12B:
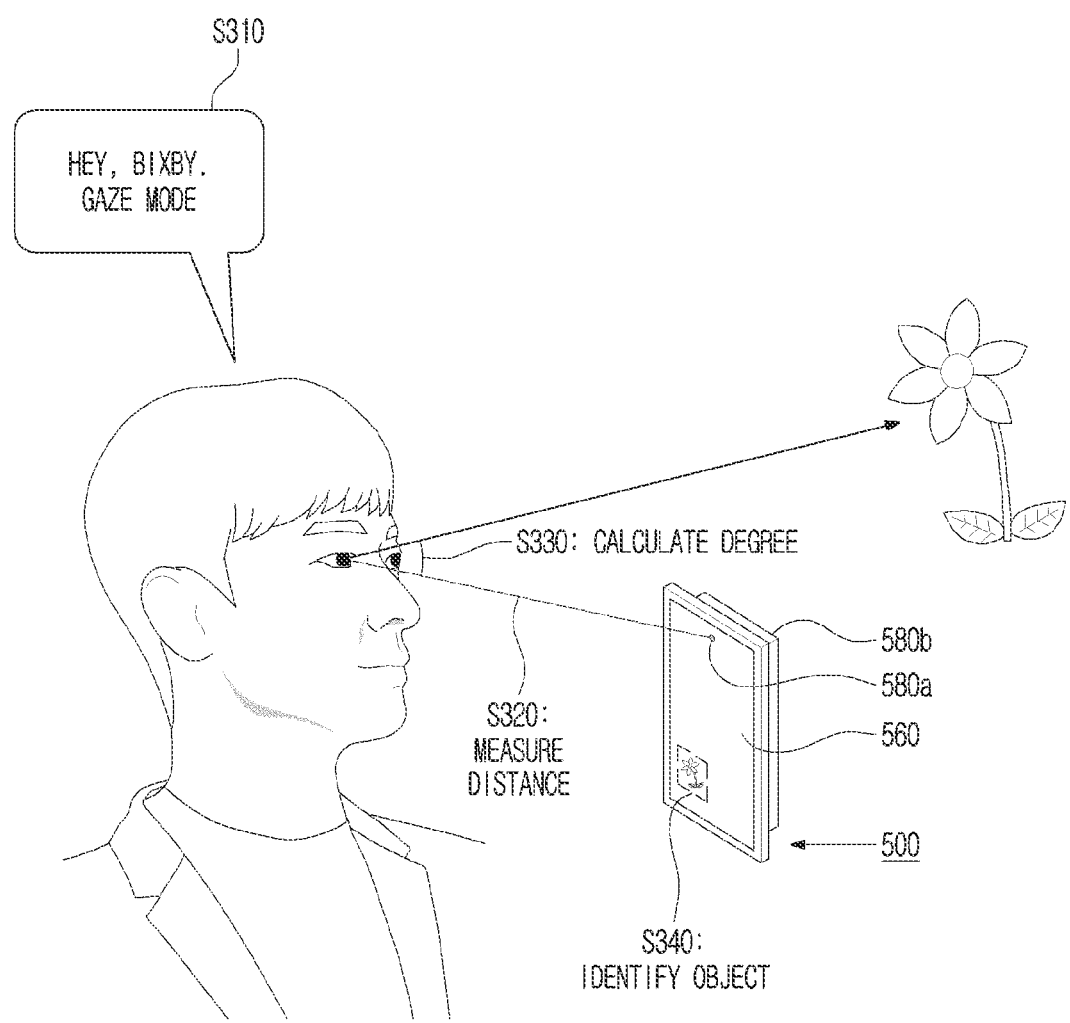
Figure 12C:
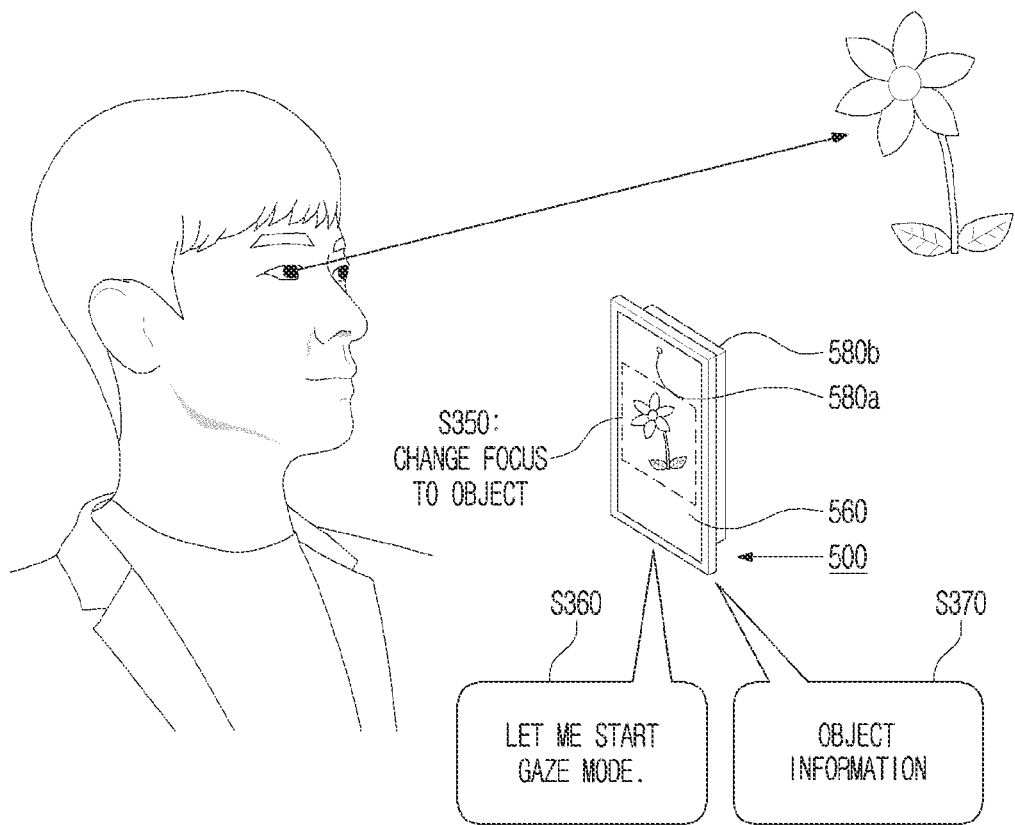

FIGS. 12A, 12B and 12C are diagrams illustrating an example of providing a bidirectional service based on a gaze direction as the electronic device 301 is implemented with a smartphone 500. Referring to FIG. 12A, a smartphone 500 may include an input module (e.g., including input circuitry) 550, an acoustic output module (e.g., including acoustic output circuitry) 555, a display module (e.g., including a display) 560, a first camera module (e.g., including a camera) 580a, and a second camera module (e.g., including a camera) 580b.

The input module 550 may include a microphone provided at the bottom of the smartphone 500 and may correspond to the input module 350 of FIG. 10. The sound output module 555 may include a speaker provided at a lower end of the smartphone 500, and may correspond to the sound output module 355 of FIG. 10.

The display module 560 may correspond to the display module 360 of FIG. 10. The first camera module 580a may be a front camera module of the smartphone 500 and may correspond to the camera module 380 of FIG. 10. The second camera module 580b may be a rear camera module of the smartphone 500 and may correspond to the camera module 380 of FIG. 10. Although not illustrated in FIG. 12A, the smartphone 500 may further include all or a portion of the components of the electronic device 301 described with reference to FIG. 10. For example, the smartphone 500 may further include additional components, such as a communication module (corresponding to 390 of FIG. 10) for communicating with an external device.

The smartphone 500 may activate or deactivate a gaze tracking mode that tracks the user's gaze direction based on the image frame generated by the first camera module 580a or the second camera module 580b in response to the user's command. In response to the gaze tracking mode being activated, the smartphone 500 may continuously track the user's gaze direction. Based on the gaze direction filtering module 250 (see FIG. 2), the smartphone 500 may correct an error that occurs due to the user's eye blinking. The smartphone 500 may track the user's gaze direction with high reliability.

Referring to FIGS. 12A and 12B, the initial capturing mode of the second camera module 580b of the smartphone 500 may be a wide mode. In the wide mode, the second camera module 580b may capture an image with wide field of view. The image captured by the second camera module 580b may be displayed through the display module 560.

The smartphone 500 may initiate a bi-directional service based on the user's gaze direction information (e.g., GDI_F) (see FIGS. 2, 3 and 4F) in response to a particular signal (e.g., a command) being generated through the input module 550 from the user. For example, in operation S310, the user may request the start of the bi-directional service by issuing a command to request a change in mode such as "Hey, Bixby! Gaze mode!"

In response to the user's command, in operation S320, the smartphone 500 may measure the distance between the user's eyes and the smartphone 500 using the first camera module 580a. For example, the first camera module 580a may include an image sensor including a distance measuring image sensor configured to measure a distance, or include distance measuring pixels configured to measure a distance. For example, the measured distance may be the distance between the first camera module 580a and the user's eyes (indicated by dotted lines).

In operation S330, the smartphone 500 may calculate a degree between the GDI_F and a virtual line. In operation S340, the smartphone 500 may identify the object at the location indicated by the GDI_F on the image displayed by the display module 560. For example, while the smartphone 500 is generating an image using the second camera module 580b, the smartphone 500 may continuously generate information on a distance to objects included in the image or a distance to the focal region using the second camera module 580b. The smartphone 500 may identify an object at a position indicated by the GDI_F filtered on the image based on the distance measured in operation S320, the degree calculated in operation S330, and the continuously generated distance.

For example, if the object indicated by the GDI_F is not identified on the image, the smartphone 500 may output a message (e.g., in the form of voice or text) that indicates that an identification, such as "The object cannot be identified", has failed.

Referring to FIGS. 12B and 12C, if an object which the GDI_F indicates on an image is identified, in operation S350, the smartphone 500 may change the focus of the second camera module 580b to the object identified by the GDI_F on the image. Thus, an enlarged image of the identified object may be captured by the second camera module 580b and displayed in the display module 560. Alternatively, even if the object indicated by the GDI_F is not identified on the image, the smartphone 500 may change the focus to a position indicated by the GDI_F.

In response to changing the focus of the second camera module 580b, in operation S360, the smartphone 500 may output a message informing a change in the mode such as "Let me start a gaze mode" (e.g., in the form of voice or text). In operation S370, the smartphone 500 may output information about the identified object in the form of voice or text. For example, the information on the identified object may include the name, type, academic information, etc. of the identified object.

As described with reference to FIGS. 12A-12C, when the reliability of the GDI_F is guaranteed, the smartphone 500 may provide the user with a bi-directional service based on the GDI_F. Accordingly, the user's convenience provided by the smartphone 500 may be increased.

Figure 13:
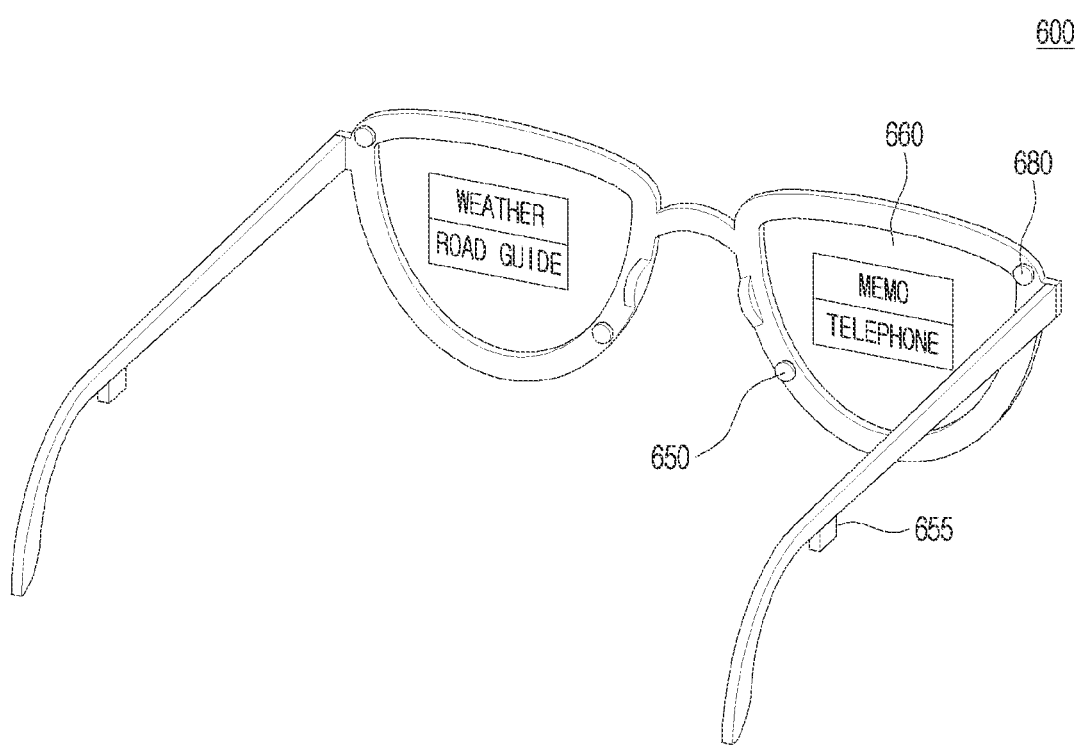
FIG. 13 is a diagram illustrating an example in which the electronic device is implemented as smart glasses according to various embodiments.

FIG. 13 is a diagram illustrating an example in which the electronic device 301 is implemented with a smart glass (e.g., smart glasses) 600. Referring to FIG. 13, the smart glass 600 may include an input module (e.g., including input circuitry) 650, an acoustic (or audio) output module (e.g., including acoustic (or audio) output circuitry) 655, a display module (e.g., including a display) 660, and a camera module (e.g., including a camera) 680.

The input module 650 may include various input circuitry, including, for example, a microphone provided at the edge of the smart glass 600 and may correspond to the input module 350 of FIG. 10. The acoustic output module 655 may include various acoustic output circuitry including, for example, a speaker provided on a holder of the smart glass 600 and may correspond to the acoustic output module 355 of FIG. 10.

The display module 660 may include a display and correspond to lenses of the smart glass 600 and may correspond to the display module 360 of FIG. 10. The display module 660 may be implemented as a transparent display. The camera module 680 may include a camera and be a front camera module of the smart glass 600 and may correspond to the camera module 380 of FIG. 10. Although not illustrated in FIG. 13, the smart glass 600 may further include all or a portion of the components of the electronic device 301 described with reference to FIG. 10. For example, the smart glass 600 may further include additional components, such as a communication module (corresponding to 390 of FIG. 10) for communicating with an external device, and an additional camera module (corresponding to 380 of FIG. 10) for capturing an image of the rear surface of the smart glass 600.

The camera module 680 may capture an image of the eye of the user. For example, the spacing and degree (e.g., relative positions) between the smart glass 600 and the eyes of the user may be kept constant. Accordingly, the processor (corresponding to 320 of FIG. 10) of the smart glass 600 may be configured to omit face recognition and feature point extraction and perform gaze direction recognition and gaze direction filtering.

For example, in response to a signal corresponding to a particular command such as "menu display" being generated in the input module 650, the smart glass 600 may display a menu including items such as weather, road guidance, memo, telephone, etc. through the display module 660. In response to the GDI_F indicated by the GDI_F staying above a reference time in a particular list, the smart glass 600 may perform an operation (or function) corresponding to the particular list.

For example, when the filtered gaze direction GD_F stays for greater than or equal to the reference time in the menu of the "weather", the smart glass 600 may output information about the forecast weather in a text or voice form. When the GD_F stays for longer than or equal to the reference time in the menu of the "road guidance", the smart glass 600 may request information of the destination to the user. In response to receiving the destination information from the user, the smart glass 600 may perform a route guidance from a current position to a destination using a text or voice message.

The smart glass 600 may record information (e.g., voice information) input by the user when the GD_F stays for greater than or equal to the reference time in the menu of the "memo". When the GD_F stays for greater than or equal to a reference time in the menu of the "phone", the smart glass 600 may request information of a contact to a user. In response to receiving the contact information from the user, the smart glass 600 may be associated (or linked) with an external smartphone to perform a call function.

For example, the electronic device 301 of the disclosure may be implemented with virtual reality goggles. The virtual reality goggles may be implemented in a similar fashion to the smart glass 600 of FIG. 13. Therefore, a repeated description will be omitted.

The electronic device according to various embodiments disclosed in the disclosure may be of various types of devices. The electronic device may include, for example, a portable communication device (e.g., a smartphone), a computer device, a portable multimedia device, a portable medical device, a camera, a wearable device, a home appliance, or the like. The electronic device according to an embodiment of the disclosure is not limited to the above-described devices.

It is to be understood that the various embodiments of the disclosure and the terms used therefor are not intended to limit the technical features set forth in the disclosure to particular embodiments, and should be understood to include various changes, equivalents, or alternatives of the embodiment. In connection with the description of the drawings, similar reference numerals may be used for similar or related components. The singular type of noun corresponding to the item may include one or plural items, unless explicitly differently directed in the relevant context. In this disclosure, each of the phrases such as "A or B", "at least one of A or B", "at least one of A, B or C", "at least one of A, B and C", and "at least one of A, B, or C" may include any one of the items listed together in the corresponding phrase, or all possible combinations thereof. Terms such as "first", "second" may simply be used to distinguish the component from other components and are not limited to other aspects (e.g., importance or order). If any (e.g., first) component is referred to in another component, with or without the term "functionally" or "communicatively", "coupled" or "connected", any of the components may be connected directly (e.g. by wire), wirelessly, or through a third component to the other components above.

The term or "module" used in the disclosure includes units including hardware, software, or firmware, and is used interchangeably with terms such as, for example, logic, logic blocks, parts, or circuits. A "module" may be an integrally constructed component or a minimum unit or part thereof that performs one or more functions. For example, the module may be configured as an integrated circuit (IC), application-specific integrated circuit (ASIC), field programmable gate array (FPGA), complex programmable logic device (CPLD), or the like.

The various embodiments of the disclosure may be implemented with software (e.g., program 340) including one or more instructions stored in the storage medium (e.g., internal memory 336 or external memory 338) readable by a machine (e.g., electronic device 301). For example, the processor (e.g., processor 320) of a device (e.g., electronic device 301) may call at least one instruction among one or more instructions stored in the storage medium and execute the instructions. This enables a device to be operated to perform at least one function according to the called at least one instructions. The instructions may include a code generated by a compiler or a code executable by an interpreter. The storage medium readable by a machine may be provided in the form of a non-transitory storage medium that is a tangible device and may not include a signal (e.g., electromagnetic wave). This term does not distinguish that data is permanently or temporarily stored in the storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

According to various embodiments, each component (e.g., a module or program) of the components described above may include a single or a plurality of entities, and some of the plurality of entities may be separately arranged in other components. According to various embodiments, one or more of the aforementioned components or operations may be omitted, or one or more other components or operations may be added. Alternatively or additionally, a plurality of elements (e.g., a module or a program) may be comprised of a single element. In this case, the integrated component may perform one or more functions of each component of each of the plurality of components equal to or similar to those performed by the components of the plurality of components prior to the integration. Operations performed by a module, a program, or another element, in accordance with various embodiments, may be performed sequentially, in a parallel, repetitively, or in a heuristically manner, or at least some operations may be performed in a different order, omitted or one or more different operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a camera module comprising a camera and configured to generate an image frame;
   memory; and
   at least one processor,
   wherein the at least one processor is configured to:
   perform face recognition of a face with respect to the image frame;
   perform extraction of a feature point of the face in response to the face being recognized during the face recognition;
   recognize a face direction of the face in response to the feature point of the face being extracted;
   generate gaze direction information by recognizing a gaze direction of the face in response to the recognition of the face direction, wherein the gaze direction information comprises consecutive image frames corresponding to the gaze direction of the face;
   generate filtered gaze direction information by performing filtering that restricts a degree of change of the gaze direction among the consecutive image frames in response to the recognition of the gaze direction; and store the filtered gaze direction information in the memory, wherein the filtering restricts the degree of change of the gaze direction based on the gaze direction information recognized from the image frame, previously filtered gaze direction information recognized from a previous image frame, and a filtering coefficient stored in the memory, and wherein the filtering coefficient is adjusted dynamically.

2. The electronic device of claim 1, wherein the filtering comprises a low pass filter (LPF).

3. The electronic device of claim 1, wherein the at least one processor is configured to recognize the face direction based on a recognition module generated based on appearance-based deep learning and executed by the at least one processor.

4. The electronic device of claim 1, wherein the at least one processor comprises a gaze direction filtering module configured to perform the filtering with respect to the gaze direction information, and wherein the gaze direction filtering module comprises:
a delay configured to receive the previously filtered gaze direction information and output the previously filtered gaze direction information with a delay;
a first multiplier configured to receive the output of the delay and a first filtering coefficient and output a multiplication of the output of the delay and the first filtering coefficient;
a second multiplier configured to receive the gaze direction information of the image frame and a second filtering coefficient and output a multiplication of the gaze direction information of the image frame and the second filtering coefficient; and
an adder configured to receive the output of the first multiplier and the output of the second multiplier, and output a sum of the output of the first multiplier and the output of the second multiplier as the filtered gaze direction information of the image frame.

5. The electronic device of claim 4, wherein the first filtering coefficient and the second filtering coefficient are adjusted dynamically.

6. The electronic device of claim 1, wherein the filtering is configured to correct an error that occurs from the gaze direction information based on actions that cause an error, and wherein the actions that cause an error comprise accidental movements that occur by eye blinking, coughs, or tic disorder.

7. The electronic device of claim 1, further comprising:
a communication module comprising communication circuitry configured to receive an image from an external device;
a display module comprising a display configured to display the image through the communication module; and
an input module comprising input circuitry configured to generate a signal from a user,
wherein, in response to a first signal being generated from the user, the at least one processor is configured to identify an object on the image corresponding to the filtered gaze direction information.

8. The electronic device of claim 7, wherein, in response to the object on the image corresponding to the filtered gaze direction information being identified, the at least one processor is configured to control the display to display information about the object on the image through the display module.

9. The electronic device of claim 8, further comprising:
a second communication module comprising communication circuitry configured to receive information about an object on the image from an external second device, and provide the information about the object on the image to the at least one processor.

10. The electronic device of claim 9, wherein, in response to a second signal being generated from the user, the at least one processor is configured to execute at least one of a first additional service through the second communication module and a second additional service not through the second communication module.

11. The electronic device of claim 1, further comprising:
a second camera module comprising a camera configured to generate an image;
a display module comprising a display configured to display the image generated by the second camera module; and
an input module comprising input circuitry configured to generate a signal from a user,
wherein, in response to a first signal being generated from the user, the at least one processor is configured to identify an object on the image corresponding to the filtered gaze direction information.

12. The electronic device of claim 11, further comprising:
a communication module comprising communication circuitry configured to communicate with an external device; and
an acoustic output module comprising acoustic output circuitry configured to output sound,
wherein, in response to an object on the image corresponding to the filtered gaze direction information being identified, the at least one processor is configured to: receive information of the object through the communication module and output information of the object through at least one of the acoustic output module or the display module.

13. The electronic device of claim 11, wherein, in response to an object on the image corresponding to the filtered gaze direction information being identified, the at least one processor is configured to control the second camera module to move a focus to the object on the image.

14. A method of operating an electronic device comprising at least one processor, a camera module, and a memory, the method comprising:
generating an image frame by the camera module;
performing face recognition of a face with respect to the image frame by the at least one processor;
performing extraction of a feature point of the face by the at least one processor in response to the face being recognized during the face recognition;
recognizing a face direction of the face by the at least one processor in response to the feature point of the face being extracted;
generating gaze direction information by recognizing a gaze direction of the face by the at least one processor in response to the recognition of the face direction, wherein the gaze direction information comprises consecutive image frames corresponding to the gaze direction of the face;
generating filtered gaze direction information by performing filtering that restricts a degree of change of the gaze direction among the consecutive image frames in response to the recognition of the gaze direction; and storing the filtered gaze direction information in the memory, wherein the filtering restricts the degree of change of the gaze direction based on the gaze direction information recognized from the image frame, previously filtered gaze direction information recognized from a previous image frame, and a filtering coefficient stored in the memory, and wherein the filtering coefficient is adjusted dynamically.

* * * * *